(12) United States Patent
Cho et al.

(10) Patent No.: US 12,521,887 B2
(45) Date of Patent: Jan. 13, 2026

(54) ELECTRONIC DEVICE FOR PROVIDING INTERACTION ON BASIS OF USER VOICE, AND METHOD THEREFOR

(71) Applicant: SAMSUNG ELECTRONICS CO., LTD., Suwon-si (KR)

(72) Inventors: Heeyoung Cho, Suwon-si (KR); Harkjoon Kim, Suwon-si (KR); Jiwon Park, Suwon-si (KR); Hyeryoung Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 209 days.

(21) Appl. No.: 18/207,989

(22) Filed: Jun. 9, 2023

(65) Prior Publication Data
US 2023/0311328 A1 Oct. 5, 2023

Related U.S. Application Data

(63) Continuation of application No. PCT/KR2021/018675, filed on Dec. 9, 2021.

(30) Foreign Application Priority Data

Dec. 9, 2020 (KR) .................. 10-2020-0171098

(51) Int. Cl.
*B25J 9/16* (2006.01)
*B25J 11/00* (2006.01)
(Continued)

(52) U.S. Cl.
CPC ......... *B25J 9/1694* (2013.01); *B25J 11/0005* (2013.01); *B25J 19/021* (2013.01);
(Continued)

(58) Field of Classification Search
CPC .... B25J 9/1694; B25J 11/0005; B25J 19/021; B25J 19/026; B25J 11/008; B25J 9/0009;
(Continued)

(56) References Cited

U.S. PATENT DOCUMENTS 10,744,641 B2  8/2020  Yang et al.
11,285,611 B2  3/2022  Park et al.
(Continued)

FOREIGN PATENT DOCUMENTS

CN  211517481 U  9/2020
JP  2006243555 A  9/2006
(Continued)

OTHER PUBLICATIONS

KR20200075161A—Park, English Trans (Year: 2020).*
(Continued)

*Primary Examiner* — Abby Lin
*Assistant Examiner* — Renee LaRose
(74) *Attorney, Agent, or Firm* — CANTOR COLBURN LLP

(57) ABSTRACT

An electronic device can include a microphone; a camera module; a short-range communication module supporting short-range wireless communication; a communication module configured to communicate with a voice recognition server; a memory; and a processor. The processor may be configured to: identify whether an object accessing the electronic device is a user; determine whether a voice interaction condition is satisfied on the basis of context information; when the user's access is identified, if the voice interaction condition is satisfied, receive user voice from the microphone, and if the voice interaction condition is not satisfied, output external interaction information that enables an external electronic device to interact with the voice recognition server by using the short-range communication (Continued)

module; receive user voice analysis information from the voice recognition server by using the communication module; and perform at least one operation on the basis of the received user voice analysis information.

19 Claims, 26 Drawing Sheets

(51) Int. Cl.
  *B25J 19/02* (2006.01)
  *G06K 19/06* (2006.01)
  *G06V 20/50* (2022.01)
  *G06V 40/10* (2022.01)
  *G10L 15/22* (2006.01)
  *G10L 15/30* (2013.01)
  *G10L 25/51* (2013.01)

(52) U.S. Cl.
  CPC ............ *B25J 19/026* (2013.01); *G06V 20/50* (2022.01); *G06V 40/10* (2022.01); *G10L 15/22* (2013.01); *G10L 15/30* (2013.01); *G10L 25/51* (2013.01); *G06K 19/06037* (2013.01); *G10L 2015/223* (2013.01)

(58) Field of Classification Search
  CPC ......... B25J 9/161; B25J 19/023; G06V 20/50; G06V 40/10; G06V 20/10; G10L 15/22; G10L 15/30; G10L 25/51; G10L 2015/223; G06K 19/06037; H04W 4/80; G06F 3/00; G06F 3/01; G06F 3/16; G06F 3/167; G06F 3/005; G06F 3/011; G06F 16/955

See application file for complete search history.

(56) References Cited

U.S. PATENT DOCUMENTS

| | | |
|---|---|---|
| 2010/0130197 A1 | 5/2010 | Wu |
| 2018/0189551 A1* | 7/2018 | Ranganath ............. G06V 40/50 |
| 2019/0260742 A1 | 8/2019 | Arora et al. |
| 2020/0005787 A1 | 1/2020 | Shin et al. |
| 2020/0122333 A1* | 4/2020 | Park ....................... B25J 13/086 |
| 2020/0126565 A1 | 4/2020 | Kim et al. |
| 2020/0133275 A1 | 4/2020 | Yoon et al. |
| 2020/0143807 A1 | 5/2020 | Ko |
| 2022/0035903 A1 | 2/2022 | Kim |

FOREIGN PATENT DOCUMENTS

| | | | |
|---|---|---|---|
| JP | 4539600 B2 | 9/2010 | |
| JP | 2016057727 A | 4/2016 | |
| JP | 2020190904 A | 11/2020 | |
| KR | 20110103537 A | 9/2011 | |
| KR | 20150081043 A | 7/2015 | |
| KR | 20180074499 A | 7/2018 | |
| KR | 20180119515 A | 11/2018 | |
| KR | 20190015430 A | 2/2019 | |
| KR | 101983852 B1 | 5/2019 | |
| KR | 20200046186 A | 5/2020 | |
| KR | 20200046803 A | 5/2020 | |
| KR | 20200075161 A * | 6/2020 | ............... G06F 8/70 |

OTHER PUBLICATIONS

International Search Report and Written Opinion for International Application No. PCT/KR2021/018675; International Filing Date Dec. 9, 2021; Date of Mailing Mar. 8, 2022; 82 Pages.
Korean Office Action corresponding to Application No. 10-2020-0171098; Dated Apr. 14, 2025.

* cited by examiner

ELECTRONIC DEVICE FOR PROVIDING INTERACTION ON BASIS OF USER VOICE, AND METHOD THEREFOR

CROSS-REFERENCE TO RELATED APPLICATIONS

This application is a continuation application, claiming priority under § 365(c), of International Application No. PCT/KR2021/018675, filed on Dec. 9, 2021, which is based on and claims the benefit of Korean patent application number 10-2020-0171098 filed on Dec. 9, 2020, in the Korean Intellectual Property Office, the disclosures of which are incorporated by reference herein in their entireties.

TECHNICAL FIELD

Various embodiments of the disclosure relate to an electronic device, and for example, to a mobile robot device that performs an operation in accordance with a user's command or request.

BACKGROUND ART

Voice recognition technology allows an electronic device to interpret a voice language that a person speaks and to convert the interpreted voice language into text data. By using an algorithm such as a hidden Markov model (HMM), an acoustic model may be constituted through statistical modeling of voices pronounced by various speakers, and a language model may be constituted by collecting a corpus.

A public mobile robot may provide various services, such as guide services for unspecified users, in a public place, such as an art gallery.

Recently, a public mobile robot and a personal robot that provide services by using a voice recognition technology have been developed.

DISCLOSURE OF INVENTION

Technical Problem

The voice recognition rate of a public type mobile robot that recognizes a user voice is easily affected by the aural quality of a surrounding environment. For example, it may be difficult to recognize voices in a noisy environment. Unfortunately, noisy environments are common in a public setting, as a large number of individuals can be present together in a public space, and thus the voice recognition of a public type mobile robot may be greatly restricted. Further, according to user preference, in case that a large number of people are present in one space, there may be a person who wants to avoid the voice interaction itself. Further, due to the awareness of the general public on pandemic infectious diseases, there may be a person who wants to avoid performing a direct interaction with a robot by using their voice in the public place.

Solution to Problem

According to various embodiments disclosed in the disclosure, an electronic device may include: a microphone; a camera module; a short range communication module configured to support a short range wireless communication; a communication module configured to communicate with a voice recognition server; a memory; and a processor operatively connected to the microphone, the communication module, and the memory. The processor is configured to: identify, using the camera module, whether an object that accesses the electronic device is a user, identify, based on context information, whether a voice interaction condition is satisfied, responsive to identifying that the object is the user and that the voice interaction condition is satisfied, receive a user voice from the microphone, and responsive to the voice interaction condition not being satisfied, output external interaction information enabling an external electronic device to perform, using the short range communication module, an interaction with the voice recognition server, receive, using the communication module, user voice analysis information from the voice recognition server, and perform at least one operation based on the received user voice analysis information.

According to various embodiments disclosed in the disclosure, a method, by an electronic device, for performing an interaction with a user may include: identifying whether an object that accesses the electronic device is a user; identifying whether to satisfy a voice interaction condition based on context information; responsive to identifying that the object is the user and that the voice interaction condition is satisfied, receiving a user voice; and responsive to the voice interaction condition not being satisfied, outputting external interaction information enabling an external electronic device to perform, using short range wireless communication, an interaction with a voice recognition server, receiving user voice analysis information from the voice recognition server; and performing at least one operation based on the received user voice analysis information.

Advantageous Effects of Invention

According to various embodiments disclosed in the disclosure, it is possible to effectively perform a voice based interaction even in case that a direct voice interaction with a public mobile robot is not easy (due, e.g., to a noisy environment, a crowded environment, etc.).

MODE FOR THE INVENTION

Figure 1:
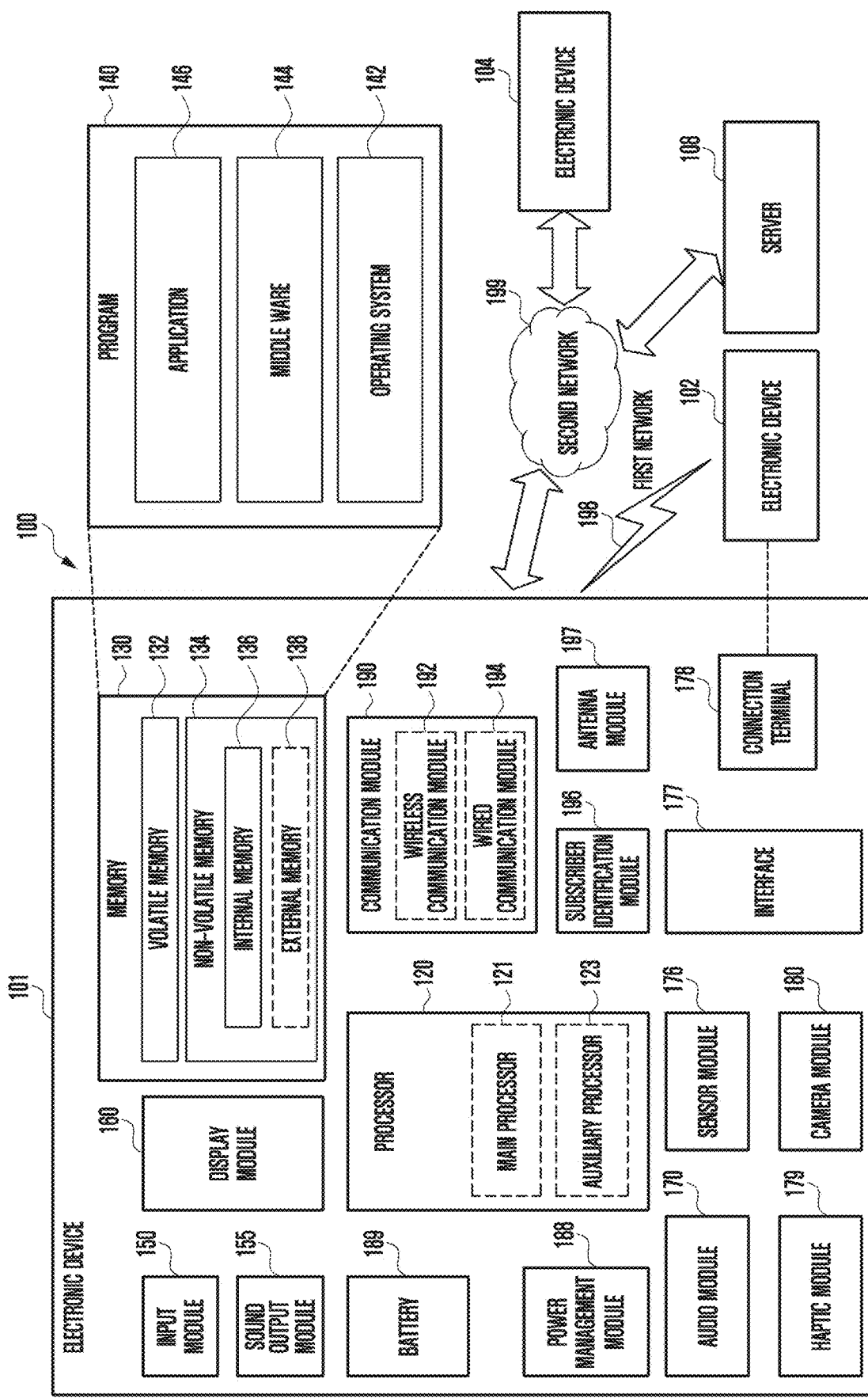
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2A:
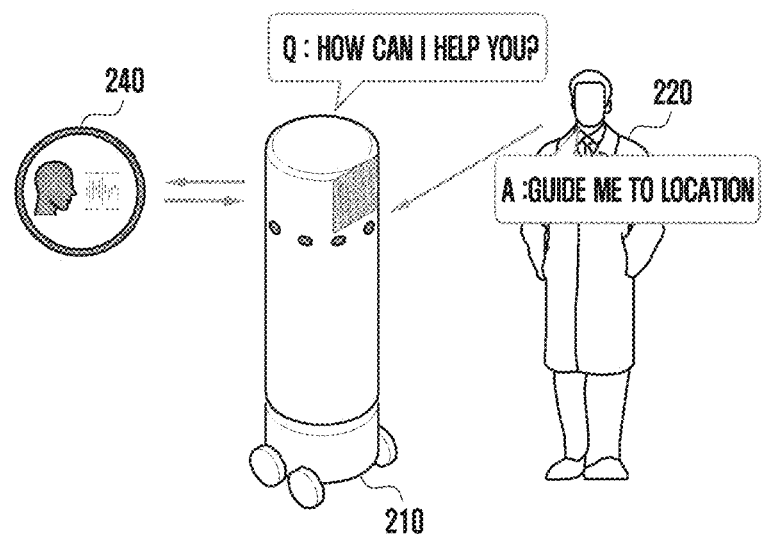
FIG. 2A is an exemplary diagram illustrating an electronic device and a server according to various embodiments.
Figure 2B:
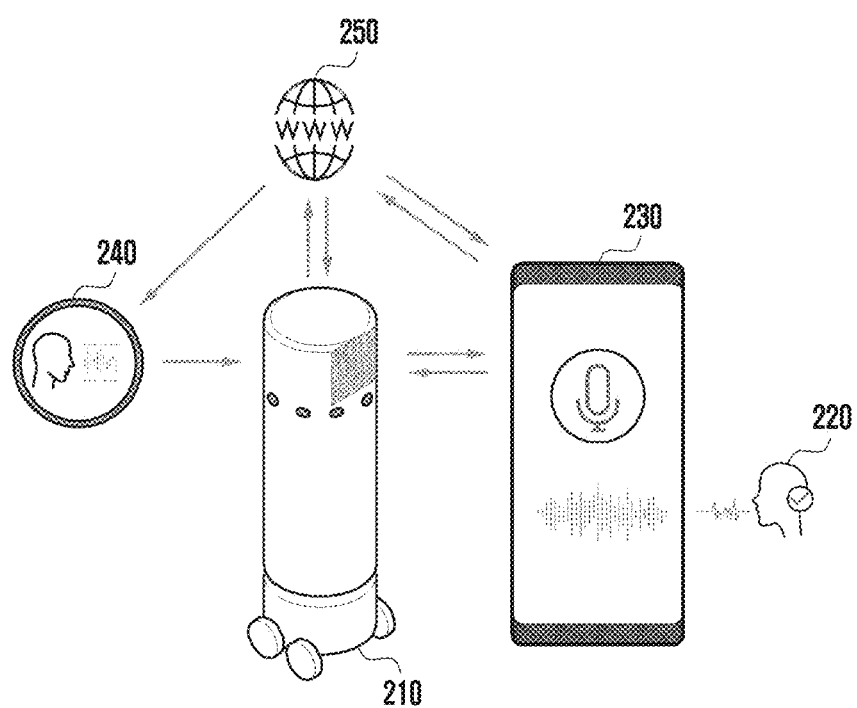
FIG. 2B is an exemplary diagram illustrating an electronic device, a server, an external electronic device, and a network according to various embodiments.

FIGS. 2A and 2B are exemplary diagrams illustrating an electronic device 210, an external electronic device 230, a voice recognition server 240, and a network server 250 according to various embodiments.

With reference to FIGS. 2A and 2B, the electronic device 210 may be a robot that recognizes the voice of a user 220. For example, the electronic device 210 may correspond to various robots, such as a public mobile robot and a home robot, as far as it recognizes a user voice and performs a service in accordance with the voice recognition. According to various embodiments, the electronic device 210 may be a robot that can be commanded and/or operated in various non-contact methods, such as user's gesture recognition, even if it does not recognize the user voice. There is no limit to the kind of the electronic device 210 disclosed in the disclosure, but for convenience, explanation in the disclosure will be made under the assumption that the electronic device 210 is limited to the public mobile robot.

With reference to FIG. 2A, the electronic device 210 may provide a voice based interaction to the user 220. The interaction may be an action of exchanging operations and/or information between the electronic device 210 and the user 220. For example, the interaction may mean that commands, requests, and/or instructions of the user 220 are transferred to the electronic device 210, and the electronic device 210 performs a designated operation. According to various embodiments, the user 220 may transfer a natural language based voice signal to the electronic device, and the electronic device 210 may receive the voice signal through an input device, such as a microphone (e.g., a microphone 330 of FIG. 3) included in the electronic device. According to various embodiments, the electronic device 210 may perform voice recognition by analyzing the voice signal received from the user 220. For example, the voice recognition may include reception of an audio signal based on a user's voice, that is, a user's voice language, conversion of the audio signal into text data through interpretation of the audio signal, and extraction of information on a semantic unit. According to various embodiments, the electronic device 210 may obtain the instruction, request, and/or command data for various operations that can be performed by the electronic device 210 through the voice recognition. According to various embodiments, the electronic device 210 may perform the voice recognition by using a voice recognition algorithm stored in a storage device (e.g., the memory 130 of FIG. 1 and/or a memory 380 of FIG. 3) included therein. According to various embodiments, the electronic device 210 may receive the user voice from the user 220, and transmit the received user voice to a voice recognition sever (e.g., the voice recognition server 240 of FIGS. 2A and 2B). The electronic device 210 may receive result information obtained by performing the voice recognition by the voice recognition server, for example, user voice analysis information from the server. According to various embodiments, the electronic device 210 may perform the voice recognition with respect to a relatively simple voice signal (e.g., voice that triggers the first operation of the electronic device 210), and may transmit other user voices to the server and receive the voice analysis information from the server. According to various embodiments, the electronic device 210 may perform at least one operation based on the result information obtained by performing the voice recognition with respect to the user voice, for example, the user voice analysis information. The at least one operation may be, for example, outputting of a designated voice and/or screen or movement and/or rotation toward a predetermined location and/or direction. According to various embodiments, the at least one operation performed by the electronic device 210 may be an interaction based service. In addition, the electronic device 210 may perform various operations based on information obtained by analyzing the user voice.

With reference to FIG. 2B, the electronic device 210 may perform an interaction with the user 220 through the external electronic device 230. According to various embodiments, the electronic device 210 may provide an interaction using the external electronic device 230 in case that it is not easy for the electronic device 210 to directly receive the voice from the user 220 and/or based on selection by the user 220. According to various embodiments, the electronic device 210 may identify whether the voice interaction condition for whether it is easy for the electronic device 210 to receive the voice directly from the user 220 is satisfied, and if the voice interaction condition is not satisfied, the electronic device 210 may provide the external interaction information for enabling the external electronic device 230 to access the voice recognition server. The external interaction information may be, for example, an address, an access code, and/or identification information designated on the network server 250. According to various embodiments, instead of directly performing the interaction with the user 220, the electronic device 210 may output address information or link information for enabling the external electronic device 230 to access a web page designated on the network server 250. According to an embodiment, the external interaction information may be one-time information. For example, if it is determined that the voice interaction condition is not satisfied, the electronic device 210 may generate new external interaction information. As another example, the external interaction information may be deleted when a predetermined time elapses after the external interaction information is generated or outputted, or may be deactivated to block the access from outside (e.g., the electronic device 210). Alternatively, the external interaction information may be deleted or deactivated when a predetermined condition is satisfied. According to various embodiments, the electronic device 210 may transmit the user voice, which the user 220 inputs to the external electronic device 230, to the network server 250, and receive, from the voice recognition server 240, the voice analysis information generated by the voice recognition server 240 having received the user voice through the network server 250. According to various embodiments, the electronic device 210 may perform at least one operation based on the voice analysis information received from the voice recognition server 240. According to an embodiment, the voice recognition server 240 may be replaced by a voice recognition engine (not illustrated) included in the electronic device 210 in addition to the server device. For example, the electronic device 210 may include the voice recognition engine, and perform the same operation as the operation of the voice recognition server 240 by using the voice recognition engine without using the voice recognition server 240. The voice recognition engine may be an operation module in the processor (e.g., a processor 370 of FIG. 3), which the processor 370 may execute by using instructions or an algorithm stored in the memory (e.g., the memory 380 of FIG. 3). In the disclosure, for convenience, explanation will be made based on an operation of the electronic device 210 performing the interaction with the user by using the voice recognition server 240.

According to various embodiments, the external electronic device 230 may transmit the user voice to the network server 250 based on the external interaction information received from the electronic device 210. The external electronic device 230 may be, for example, a terminal device carried by the user. According to various embodiments, the external electronic device 230 may be a user's portable terminal device or a terminal capable of accessing an external network (e.g., Internet), such as laptop or tablet PC. Further, the external electronic device 230 may be another electronic device provided at a distance adjacent to or spaced apart from the electronic device 210, in addition to the device carried by the user. The external interaction information may be, for example, an address, an access code, and/or identification information designated on the network server 250. The external electronic device 230 may receive the user voice from the user 220, and transmit the received user voice to the network server 250.

According to various embodiments, the voice recognition server 240 may perform the voice recognition. According to various embodiments, the voice recognition server 240 may receive the user voice, and generate the voice analysis information by analyzing the user voice. According to various embodiments, the voice recognition server 240 may generate the instruction, request, and/or command data for various operations that can be performed by the electronic device 210 by analyzing the user voice, and transmit the generated data to the electronic device 210. According to an embodiment, the voice recognition server 240 may receive the user voice from the electronic device 210. According to various embodiments, the voice recognition server 240 may receive the user voice from the network server 250. According to various embodiments, the voice recognition server 240 may recognize a gesture. For example, the voice recognition server 240 may receive image information (e.g., user image) that is to be analyzed, and generate user's gesture information based on the image information analysis.

According to various embodiments, the network server 250 may provide a network environment including wired and/or wireless networks to the electronic device 210, the voice recognition server 240 and/or the external electronic device 230. According to various embodiments, the wired and/or wireless networks may include at least a part of a wide area network (e.g., the second network 199 of FIG. 1). The network may be, for example, at least one of a cellular network, 5G network, next generation communication network, and Internet. The network server 250 may be, for example, a web server using a web (World Wide Web (WWW)) based system. According to various embodiments, the network server 250 may store a web page related information for transmitting the user voice from the external electronic device 230 to the voice recognition server 240. For example, the external electronic device 230 may transmit the user voice to the network server 250 by accessing the web page on the network server 250. According to various embodiments, the network server 250 may transmit the user voice to the voice recognition server 240. According to various embodiments, the network server 250 may provide the web page to the external electronic device 230, and the web page may include a graphic user interface (GUI) for receiving the user voice from the external electronic device 230. According to various embodiments, the web page may include application information for transmitting information from the external electronic device 230 to the electronic device 210. According to various embodiments, the web page provided by the network server 250 may provide an input through an operation of the electronic device 210 and a keyboard input in addition to the user voice.

According to various embodiments, the voice recognition server 240 and the network server 250 may be included in one server device, or may operate as independent server devices.

Figure 3:
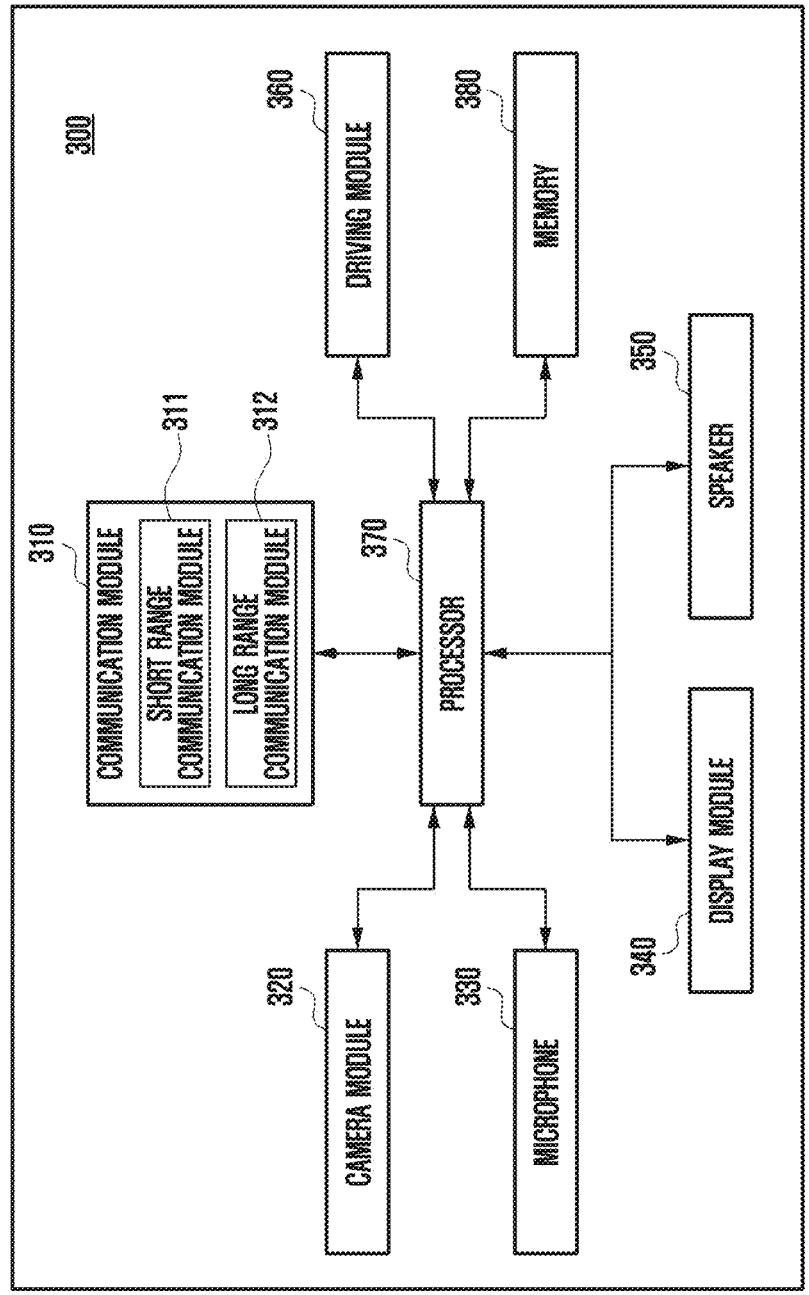
FIG. 3 is a block diagram of an electronic device that provides a voice based interaction to a user according to various embodiments.

FIG. 3 is a block diagram of an electronic device that provides a voice based interaction to a user according to various embodiments.

With reference to FIG. 3, an electronic device 300 may include a communication module 310, a camera module 320, the microphone 330, a display module 340, a speaker 350, a driving module 360, the processor 370, and the memory 380. The electronic device 300 may include at least one of constitutions and/or functions of the electronic device 101 of FIG. 1.

According to various embodiments, the communication module 310 may perform connections to external electronic devices (e.g., the external electronic device 230, voice recognition server 240, and/or network server 250 of FIG. 2B) by using wireless network communication (e.g., the first network 198 of FIG. 1 and the second network 199 of FIG. 1). The communication module 310 may support short range wireless communication (e.g., Bluetooth, Bluetooth low energy (BLE), near field communication (NFC), wireless fidelity (Wi-Fi) direct, infrared data association (IrDA), and/or ultra-wideband (UWB)), and transmit information to the external electronic device (e.g., the external electronic device 230 of FIG. 2B) by using the short range wireless communication. According to various embodiments, the communication module 310 may include a short range communication module 311 for the short range wireless communication, and the short range communication module 311 may perform a unidirectional or bidirectional communication with the external electronic device 230. The unidirectional communication may be limited to, for example, transmission of information to the external electronic device 230, and the transmission of the information may be composed of simple output of a predetermined signal to the outside. According to various embodiments, the communication module 310 may support long range wireless communication (e.g., cellular network, 5G network, next generation communication network, and Internet), and transmit and receive data to and from the server (e.g., the voice recognition server 240 and/or network server 250 of FIG. 2B) by using the long range wireless communication. According to various embodiments, the communication module 310 may include a long range communication module 312 for the long range wireless communication, and transmit and receive data to and from the server by using the long range communication module 312. The long range communication module 312 may be, for example, a communication module configured to communicate with the server (e.g., the voice recognition server 240 and/or network server 250 of FIG. 2B).

According to various embodiments, the camera module 320 may capture an image or a video of an external environment of the electronic device 300. The camera module 320 may include at least a part of the constitutions and/or functions of the camera module 180 of FIG. 1. According to various embodiments, the camera module 320 may generate image information by converting light incident from the outside into an electrical signal. According to various embodiments, the camera module 320 may capture an image of an external environment of the electronic device 300, and generate image information obtained by capturing the image of the surrounding environment.

According to various embodiments, the microphone 330 may receive a voice outside the electronic device 300. The microphone 330 may include at least one of constitutions and/or functions of the input module 150 and audio module 170 of FIG. 1. According to various embodiments, the microphone 330 may receive an audio signal outside the electronic device 300, and generate voice information by converting the received audio signal into an electrical signal. According to various embodiments, the electronic device 300 may receive the user voice from the user by using the microphone 330. According to various embodiments, the electronic device 300 may receive the audio signal around the electronic device 300 by using the microphone 330, and generate noise level information. According to various embodiments, the electronic device 300 may include a plurality of microphones 330. According to various embodiments, the plurality of microphones 330 may form a microphone array, and the microphone array may be distributed and disposed at each location of the electronic device 300. According to various embodiments, the microphone 330 may be a directional microphone. According to various embodiments, the electronic device 300 may identify the location and/or direction of the audio signal generated outside the electronic device 300 by using the microphone array formed by the microphones 330.

According to various embodiments, the display module 340 may display information to the outside of the electronic device 300. The display module 340 may include at least a part of the constitutions and/or functions of the display module 160 of FIG. 1. According to various embodiments, the display module 340 may include a display panel, and visually display the information received from the processor (the processor 370 of FIG. 3). According to various embodiments, the display module 340 may include a touch sensor and/or a pressure sensor, and receive a user's touch input.

According to various embodiments, the speaker 350 may output sound to the outside of the electronic device 300. The speaker 350 may include at least a part of the constitutions and/or functions of the output module 155 and audio module 170 of FIG. 1. According to various embodiments, the speaker 350 may convert an electrical signal into a sound signal, and output the sound signal. According to various embodiments, the speaker 350 may receive the voice information from the processor (e.g., the processor 370 of FIG. 3), and output the sound signal based on the received voice information to the outside of the electronic device 300.

According to various embodiments, the driving module 360 may physically move and/or rotate the electronic device 300. The driving module 360 may include a motor that transfers power by using an electric force or an internal combustion engine (e.g., engine) that transfers power by using fuel. According to various embodiments, the driving module 360 may include a power unit composed of a battery or tank for storing the power (e.g., electric force or internal combustion force), and the power unit (not illustrated) may transfer the stored power to a driving unit (not illustrated). According to embodiments, the driving module 360 may include the driving unit that moves and/or rotates the electronic device 300. The driving unit may include, for example, a constituent element that supplies kinetic energy of the power unit to the electronic device 300, such as a gear, wheels, caterpillar, or roller. According to various embodiments, the electronic device 300 may move to a designated location or may rotate in a designated direction by using the driving module 360.

According to various embodiments, the memory 380 may be configured to store digital data temporarily or permanently, and include at least a part of the constitutions and/or functions of the memory 130 of FIG. 1. Further, the memory 380 may store at least a part of the program 140 of FIG. 1. The memory 380 may store various instructions that can be performed by the processor (e.g., the processor 370 of FIG. 3). Such instructions may include control commands, such as logical operations and data input/output, which can be recognized and executed by the processor 370. The kind and/or amount of data that can be stored in the memory 380 may not be limited, but in the disclosure, only the constitution and the function of the memory related to a method for providing the voice based interaction with the user according to various embodiments and the operation of the processor 370 that performs the method will be described.

According to various embodiments, the processor 370 may process an arithmetic operation or data related to control and/or communication of constituent elements of the electronic device 300. The processor 370 may include at least a part of the constitutions and/or functions of the processor 120 of FIG. 1. The processor may be operatively, electrically, and/or functionally connected to the constituent elements of the electronic device 300, such as the communication module 310, camera module 320, microphone 330, display module 340, speaker 350, driving module 360, and memory 380. The operations of the processor 370 according to various embodiments may be performed in real time. For example, in case that the electronic device 300 performs the voice based interaction with the user (e.g., the user 220 of FIGS. 2A and 2B), information transfer among the electronic device 300, user 220, external electronic device (e.g., external electronic device 230 of FIG. 2B), and server (e.g., voice recognition server 240 and/or network server 250 of FIG. 2B) may be performed simultaneously or within a negligible small time span, and the subsequent arithmetic operation for the operation of the processor 370 may also be performed simultaneously or within a very small time span. The kind and/or amount of operation, arithmetic operation, and data processing, which can be performed by the processor 370 may not be limited, but in the disclosure, only the constitution and the function of the processor 370 related to a method for providing the voice based interaction with the user according to various embodiments and the operation to perform the method will be described.

According to various embodiments, the processor 370 may determine whether the user accesses. The processor 370 may receive the image obtained by capturing an image outside the electronic device 300 using the camera module 320. According to various embodiments, the processor 370 may make the camera module 320 operate continuously and/or periodically, and receive information on images captured continuously and/or periodically by the camera module 320. According to various embodiments, the processor 370 may capture an external image by using the camera module 320, and determine whether the user accesses by analyzing the image of a person present in the image. For example, the processor 370 may analyze the image, captured by using the camera module 320, in real time, or transmit the captured image to the external server, and thus receive the data analyzed by the external server in real time. According to various embodiments, if the person recognized in the captured image enters a designated radius from the electronic device 300, the processor 370 may continuously track the image of the recognized person. According to various embodiments, while tracking the image of the person having entered the designated radius, the processor 370 may determine whether the corresponding person has reached the distance at which it is suitable for the electronic device 300 to start the user interaction, and perform the operation based on the corresponding determination. According to various embodiments, the processor 370 may recognize the face of the recognized person from the image. For example, the processor 370 may analyze the captured image, recognize the person through image analysis, and recognize and identify the face of the person. According to various embodiments, the processor 370 may analyze the image captured at the designated time and thus recognize and identify all faces of persons, who are present in the corresponding image, or may limitedly recognize and identify the faces of the persons who enter the designated distance from the electronic device 300. According to various embodiments, the processor 370 may recognize the face of the person (e.g., the user) who approaches the electronic device 300, and distinguish the person from others. For example, the processor 370 may distinguish the user by using data corresponding to face identification information temporarily and/or permanently stored in the memory 380. According to various embodiments, the processor 370 may simply identify whether one user is different from other users, and may continuously identify the user having data identified in the past. Further, the processor 370 may select, recognize, and identify only a specific user (e.g., a manager).

According to various embodiments, the processor 370 may identify the optimum interaction place and/or direction, and guide the user toward the optimum interaction place and/or direction.

According to various embodiments, the processor 370 may identify the optimum interaction place and/or direction. In order to perform the voice based interaction, it may be suitable for the electronic device 300 to perform the interaction in a low noise place or direction. The optimum interaction place and/or direction may be, for example, a place and/or direction with a low noise level. For example, the optimum interaction place and/or direction may be explained as the optimum interaction location. The optimum interaction location may include at least one of the optimum interaction direction and the optimum interaction place. According to various embodiments, the processor 370 may receive an audio signal outside the electronic device 300 by using the microphone 330. According to various embodiments, the microphone 330 may include a plurality of microphones, and the plurality of microphones may be distributed and disposed at respective locations of the electronic device 300 to form a microphone array. According to various embodiments, the microphones 330 forming the microphone array may receive external audio signals, and generate noise level information including volume information, volume information for each direction, and volume information for each location. According to various embodiments, the processor 370 may identify the optimum interaction place and/or direction corresponding to the location and/or direction at low noise level by using the noise level information. According to various embodiments, the processor 370 may receive the noise level information from the outside (e.g., a sensor server). For example, a sensor matrix disposed at respective locations in the same space as that of the electronic device 300 may measure the noise levels for each location in the corresponding space, generate the noise level information as the result of measuring the noise levels for each location, and transmit the noise level information to the sensor server and/or the electronic device 300. The processor 370 may receive the noise level information from the sensor server and/or the sensor matrix, and identify the optimum interaction place and/or direction by using the received noise level information. According to various embodiments, while the processor 370 does not perform the interaction with the user, it may move in the designated space periodically and/or repeatedly by controlling the driving module 360, receive the audio signal by controlling the microphone 330, and transmit location information and the audio signal to the server (e.g., the sensor server). The server may generate the noise level information in accordance with the noise levels for each location by using the location information and the audio signal that are transmitted by the processor 370, and transmit the generated noise level information to the processor 370. The processor 370 may identify the optimum interaction place and/or direction by using the noise level information received from the server.

According to various embodiments, the processor 370 may guide the user toward the optimum interaction place and/or direction. According to various embodiments, the processor 370 may allow the user to recognize the optimum interaction place and/or direction by outputting information on the identified optimum interaction place and/or direction to the display module 340. For example, the processor 370 may output a message for movement to the optimum interaction place to the display module 340. According to various embodiments, the processor 370 may guide the user toward the optimum interaction place and/or direction by outputting the information on the optimum interaction place and/or direction and/or a message for movement toward the optimum interaction place and/or direction to the speaker 350. According to various embodiments, the processor 370 may guide the user toward the optimum interaction place and/or direction by moving and/or rotating the electronic device 300 by controlling the driving module 360.

According to various embodiments, the processor 370 may identify whether the voice interaction condition is satisfied. For example, the voice interaction condition may be the condition regarding whether it is suitable for the electronic device 300 to perform the voice based interaction directly with the user (e.g., the user 220 of FIGS. 2A and 2B). According to various embodiments, the voice interaction condition may be identified based on at least one of noise level information, density level information, content sensitivity information, and user selection information. According to an embodiment, the noise level information, the density level information, the content sensitivity information, and the user selection information may mean context information. For example, the context information may include at least one of the noise level information, the density level information, the content sensitivity information, and the user selection information. According to various embodiments, the processor 370 may determine whether the voice interaction condition is satisfied, based on the context information. The noise level information may be, for example, noise level information on a place where the interaction is performed. It may not be easy to detect and analyze the user voice from the audio signal received in a noisy place. Due to the noise, the recognition rate for the user voice may be low, and it may not be suitable to directly perform the voice interaction in the noisy place, and it may be determined that the voice interaction condition is not satisfied. According to various embodiments, the processor 370 may obtain the noise level information, and identify whether the voice interaction condition is satisfied, based on the obtained noise level information. For example, the density level information may mean how much persons are crowded around the user. In a crowded place, the user may be reluctant or uncomfortable to perform voice interaction directly with the electronic device 300. According to various embodiments, the processor 370 may identify the persons around the electronic device 300 and their locations excluding the user 220 by analyzing the image obtained by capturing the surrounding environment by using the camera module 320, and generate the density level information by calculating the density based on the number of the identified persons and the number and the locations of the persons. Alternatively, the processor 370 may receive the density level information from the outside (e.g., the sensor server). According to various embodiments, the processor 370 may identify whether the voice interaction condition is satisfied, based on the obtained density level information. According to various embodiments, if the density level is high, the processor 370 may identify that the voice interaction condition is not satisfied. The content sensitivity information may mean the sensitivity of information which is provided by the user or which can be provided to the user by the electronic device 300 in case that information that may be sensitive to the user 220 should be based during the operation of the electronic device 300 being scheduled or performed. For example, the content sensitivity information may mean the sensitivity of the information (e.g., content) that should be provided by the user for the operation of the electronic device 300. The information which the user may be reluctant to publicly pronounce in public places (e.g., personal information such as the date of birth) but needs to provide the electronic device 300, and the information that may provide shame or embarrassment personally and/or socially may have high content sensitivity, and the user may be reluctant to perform the direct voice interaction regarding the content having high sensitivity. According to various embodiments, the content sensitivity information may be stored in the memory 380, and the processor 370 may identify that the voice interaction condition is not satisfied when the content sensitivity is high based on the content sensitivity information. The user selection information may mean, for example, information on the method for performing the voice interaction, which is selected by the user. For example, the user may select whether to perform the direct voice interaction with the electronic device 300 or whether to perform the interaction using the external electronic device (e.g., the external electronic device 230 of FIG. 2B), and the processor 370 may receive the user selection information regarding the selection from the user. The processor 370 may receive the user's touch input from the display module 340, or receive the user selection information through recognition of the user voice. According to various embodiments, if the user intends to receive the external interaction information using the external electronic device 230, the processor 370 may recognize this intention, and identify information on the corresponding intention as the user selection information. According to various embodiments, if the recognition of the user voice has failed, if a voice recognition failure message is received from the voice recognition server (e.g., the voice recognition server 240 of FIGS. 2A and 2B), or if the voice recognition failure occurs or the voice recognition failure message is received over a designated number of times, the processor 370 may determine that it is suitable to perform the interaction using the external electronic device 230, and identify the voice interaction condition by including the information on the voice recognition failure in the user selection information.

According to various embodiments, if it is identified that the voice interaction condition is satisfied, the processor 370 may receive the user voice, and transmit the received user voice to the voice recognition server. According to various embodiments, if the voice interaction condition is satisfied, the processor 370 may receive the user voice from the microphone 330. According to various embodiments, if the voice interaction condition is satisfied, the processor 370 may transmit the received user voice to the voice recognition server 240, and receive the analyzed user voice analysis information from the voice recognition server. According to various embodiments, the processor 370 may perform at least one operation based on the received voice analysis information.

According to various embodiments, if the voice interaction condition is not satisfied, the processor 370 may perform the interaction with the user 220 through the external electronic device 230. According to various embodiments, the processor 370 may output the external interaction information to the outside of the electronic device 300. The external interaction information may be, for example, an address, an access code, and/or identification information designated on the network server (e.g., the network server 250 of FIG. 2B). According to various embodiments, instead of directly performing the interaction with the user 220, the electronic device 210 may output address information or link information for enabling the external electronic device 230 to access a web page designated on the network server 250. According to an embodiment, the external interaction information may be one-time information. For example, if it is determined that the voice interaction condition is not satisfied, the processor 370 may generate new external interaction information. As another example, the external interaction information may be deleted when a predetermined time elapses after the external interaction information is generated or outputted, or may be deactivated to block the access from the outside (e.g., the electronic device 210). Alternatively, the external interaction information may be deleted or deactivated when a predetermined condition is satisfied.

According to various embodiments, the processor 370 may recognize different users, and generate and/or update the external interaction information based on the user recognition. According to various embodiments, the processor 370 may recognize the face of the recognized person from the image. For example, the processor 370 may analyze the captured image, recognize the person through the image analysis, and recognize and identify the face of the person. According to various embodiments, the processor 370 may analyze the image captured at the designated time and thus recognize and identify all faces of persons, who are present in the corresponding image, or may limitedly recognize and identify the faces of the persons who enter the designated distance from the electronic device 300. According to various embodiments, the processor 370 may recognize the face of the person (e.g., the user) who approaches the electronic device 300, and distinguish the person from others. For example, the processor 370 may distinguish the user by using data corresponding to the face identification information temporarily and/or permanently stored in the memory 380. According to various embodiments, the processor 370 may simply identify whether one user is different from other users, and may continuously identify the user having data identified in the past. Further, the processor 370 may select, recognize, and identify only a specific user (e.g., a manager). According to various embodiments, the processor 370 may update the external interaction information based on the identified user recognition. In case of a different user, the external interaction information may require a different web page, and in case of simply identifying the different user from the previous user based on the user recognition, the processor 370 may update the external interaction information even if the user is simply recognized as a new user after a predetermined time elapses from one interaction end, and further, update the external interaction information in order to select the specific user (e.g., the manager) and separately provide the external interaction information for the manager According to various embodiments, the external interaction information output by the processor 370 may be the external interaction information updated based on the user recognition. According to various embodiments, the processor 370 may output the updated external interaction information.

According to various embodiments, the processor 370 may output the external interaction information through the short range wireless communication by controlling the communication module 310. According to various embodiments, the communication module 310 may support the short range wireless communication, for example, Bluetooth, Bluetooth low energy (BLE), near field communication (NFC), wireless fidelity (Wi-Fi) direct, infrared data association (IrDA), and/or ultra-wideband (UWB), and the processor 370 may output the external interaction information to the outside by using the short range wireless communication. According to various embodiments, the processor 370 may input and/or update the external interaction information on an NFC tag provided in the communication module 310. For example, the processor 370 may write designated information onto the NFC tag, and the signal output may be performed in a manner that the NFC tag having received energy by an electromagnetic field emitted from the external electronic device 230 emits a signal caused by the electromagnetic induction. According to various embodiments, the processor 370 may output a message for guiding the user to receive the external interaction information by using the display module 340 and/or the speaker 350, and the external electronic device 230 may receive the external interaction information by using the NFC tagging. According to various embodiments, the processor 370 may be connected to the external electronic device 230 by using the UWB communication, and transmit the external interaction information to the external electronic device 230. According to various embodiments, the processor 370 may generate a quick response (QR) code including the external interaction information. According to various embodiments, the processor 370 may generate the QR code including the external interaction information, and output the QR code by controlling the display module 340. According to various embodiments, the processor 370 may output the message for guiding the user to receive the external interaction information by using the display module 340 and/or the speaker 350, and the external electronic device 230 may receive the external interaction information through capturing and recognizing the QR code.

According to various embodiments, the processor 370 may receive user voice analysis information form the voice recognition server 240. According to various embodiments, the external electronic device 230 may perform connection with the network server 250 by using the external interaction information. The external electronic device 230 may input and transmit the user voice on a user interface provided by the network server 250. According to various embodiments, the web page provided by the network server 250 may include the user interface for receiving the user input, and the user input that can be received may include the user voice, an input related to an operation of the electronic device 300, and a keyboard input. According to various embodiments, the network server 250 may receive the user input (e.g., user voice) from the external electronic device 230 connected thereto, and transmit the received input to the voice recognition server 240 and/or the electronic device 300. The processor 370 may receive the voice analysis information generated by the voice recognition server 240 having received the user voice through the network server 250 from the voice recognition server 240. According to various embodiments, the processor 370 may directly receive the user input from the network server 250.

According to various embodiments, the processor 370 may perform at least one operation based on the voice analysis information received from the voice recognition server 240. According to various embodiments, the processor 370 may perform at least one operation based on the user input received from the network server 250. The at least one operation that is performed by the processor 370 based on the user input and/or the user voice analysis information may be at least one of the movement, rotation, audio signal output, and display output of the electronic device. For example, the processor 370 may provide a guide service or a customer service including at least one of such operations based on the user voice analysis information.

According to various embodiments, the processor 370 may determine whether the interaction end condition is satisfied. The interaction end condition may be the condition for determining whether the interaction is ended through the external electronic device 230. The interaction may be an action of exchanging operations and/or information between the electronic device 300 and the user 220. For example, the interaction may mean that a command, a request, and/or instructions of the user 220 are transferred to the electronic device 210, and the electronic device 210 performs a designated operation. According to various embodiments, the processor may determine the interaction end condition based on whether a new input is not received when more than a predetermined time elapses after the input is finally received from the user 220 having accessed the electronic device, whether the user 220 having accessed the electronic device has moved beyond a predetermined distance from the electronic device 300, whether at least one operation based on the received user voice analysis information is ended in all, and whether the voice interaction condition is switched from an unsatisfied state to a satisfied state. According to various embodiments, the processor 370 may determine whether more than a predetermined time elapses without a new input after the input is finally received from the user based on that the user voice received by the processor 370 from the microphone 330 has not been received over the predetermined time. Further, the processor 370 may determine the same based on that the processor 370 does not receive the new voice analysis information over the predetermined time from the time when the processor 370 finally receives the user voice analysis information from the voice recognition server 240. Further, the voice recognition server 240 may determine that the user voice has not been received in the voice recognition server 240 over the predetermined time, and transmit that the interaction end condition is satisfied to the electronic device 300, and the processor 370 may determine whether the interaction end condition is satisfied through reception of the information on that the interaction end condition is satisfied from the voice recognition server 240. Further, the network server 250 may determine whether the interaction end condition is satisfied based on that the user voice has not been received in the voice recognition server 240 over the predetermined time. According to various embodiments, in order to determine whether the user has moved to exceed a predetermined distance from the electronic device, the processor 370 may control the camera module 320 to capture the image for the user continuously and/or periodically during the interaction. According to various embodiments, the processor 370 may determine whether the user gets out of the electronic device 300 over the predetermined distance, and if the user gets farther away over the predetermined distance, the processor 370 may determine that the interaction end condition is satisfied. According to various embodiments, the processor 370 may perform at least one operation based on the user voice analysis information, and if the at least one operation based on the user voice analysis information is completed in all, the processor 370 may determine that the interaction end condition is satisfied. According to various embodiments, the processor 370 may output the external interaction information by determining that the voice interaction condition is not satisfied, and continuously identify the voice interaction condition while performing the interaction with the user. According to various embodiments, if it is determined that the voice interaction condition is switched from the existing unsatisfied state to the satisfied state, the processor 370 may determine that the interaction end condition is satisfied based on the determination of the corresponding switching.

According to various embodiments, if it is identified that the interaction end condition is satisfied, the processor 370 may delete the updated external interaction information. The external interaction information may include information that is connectable between the external electronic device 230 and the network server 250. In case that the external interaction information is continuously effective even after the interaction with one user is ended, the user of the ended interaction may remotely perform the interaction, and the electronic device 300 may be unable to provide the interaction to a new user. For example, in case that the electronic device 300 is a public mobile robot, it may continuously perform the interaction even after the user gets out of the movement radius of the public mobile robot, and this may obstacle to the utility of the public mobile robot. In order to prevent this, the processor 370 may delete the external interaction information if it is identified that the interaction is ended. According to various embodiments, the server that is connected to the external electronic device 230 by using the external interaction information may delete connection information (e.g., address information for accessing a web page, link information, designated address on the network server 250, access code and/or identification information) included in the external interaction information. For example, the network server 250 may delete the web page address for providing the connection with the external electronic device 230 in which the interaction end condition is satisfied. According to various embodiments, the voice recognition server 240 may directly identify whether the interaction end condition is satisfied, or may identify whether the interaction end condition is satisfied through reception of the information identified by the electronic device 300 from the electronic device 300. According to various embodiments, the network server 250 may directly identify whether the interaction end condition is satisfied, or may identify whether the interaction end condition is satisfied through reception of the information identified by the electronic device 300 from the electronic device 300.

Figure 4:
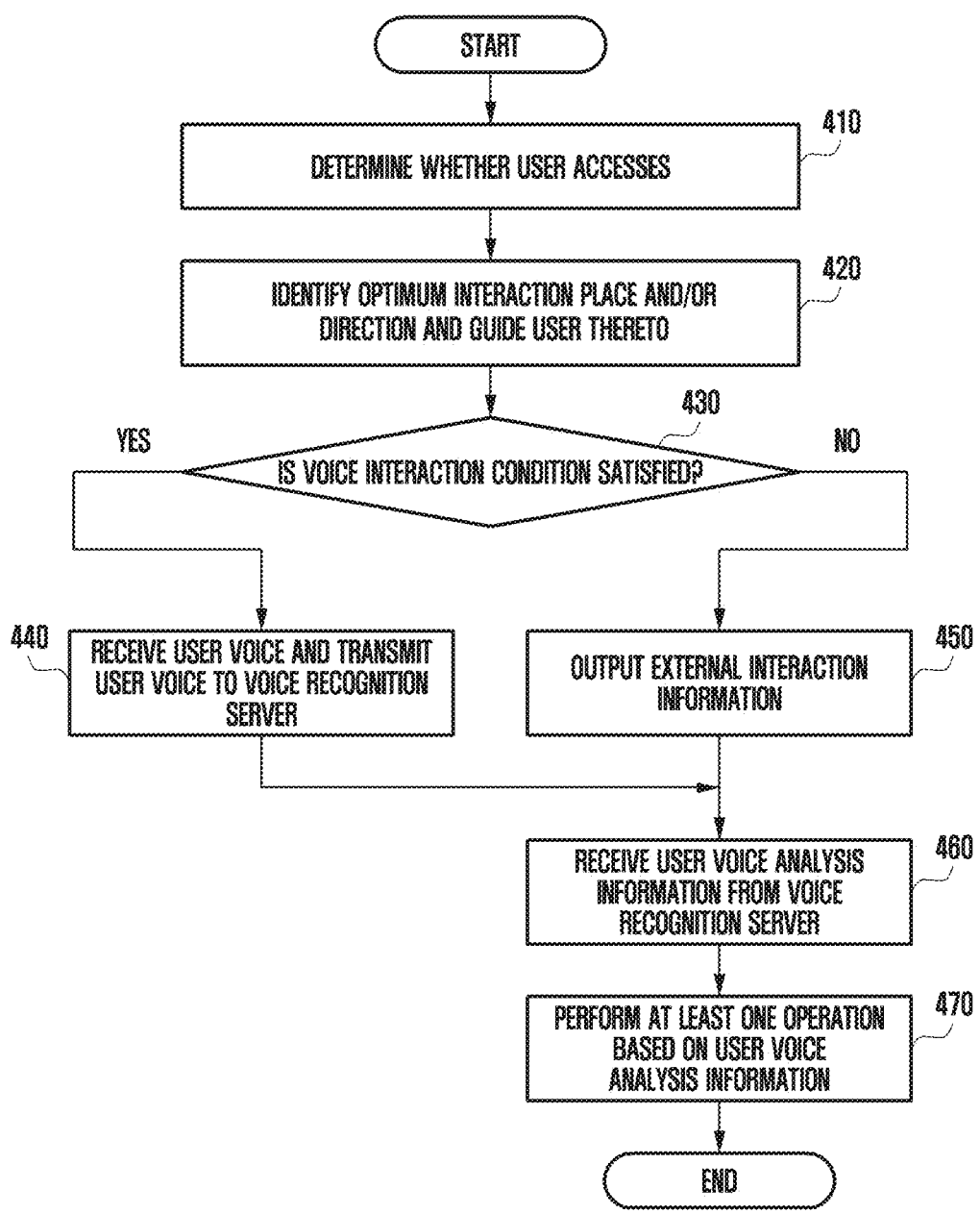
FIG. 4 is an operational flowchart of an electronic device that provides a voice based interaction to a user according to various embodiments.

FIG. 4 is an operational flowchart of an electronic device that provides a voice based interaction to a user according to various embodiments.

With reference to FIG. 4, operations of the electronic device (e.g., electronic device 101 of FIG. 1, electronic device 210 of FIGS. 2A and 2B, and/or electronic device 300 of FIG. 3) that provides the voice based interaction to the user may be understood as operations performed by the processor (e.g., processor 120 of FIG. 1 and/or processor 370 of FIG. 3) included in the electronic device.

With reference to step 410, the processor (e.g., processor 370 of FIG. 3) may determine whether the user accesses. The processor 370 may receive the image obtained by capturing an image outside the electronic device (e.g., electronic device 300 of FIG. 3) from the camera module (e.g., camera module 320 of FIG. 3). According to various embodiments, the processor 370 may make the camera module 320 operate continuously and/or periodically, and receive image information captured continuously and/or periodically by the camera module 320. According to various embodiments, the processor 370 may capture an external image by using the camera module 320, and determine whether the user accesses by analyzing the image of a person present in the image. For example, the processor 370 may analyze the image captured by using the camera module 320 in real time, or transmit the captured image to the external server, so that the external server may receive the data analyzed in real time. According to various embodiments, if the person recognized in the captured image enters a designated radius from the electronic device 300, the processor 370 may continuously track the image of the recognized person. According to various embodiments, while tracking the image of the person having entered the designated radius, the processor 370 may determine whether the corresponding person has reached the distance in which it is suitable for the electronic device 300 to start the user interaction, and perform the operation based on the corresponding determination. According to various embodiments, the processor 370 may recognize the face of the person recognized from the image. For example, the processor 370 may analyze the captured image, recognize the person through the image analysis, and recognize and identify the face of the person. According to various embodiments, the processor 370 may recognize and identify all faces of the persons, who are present in the corresponding image by analyzing the captured image at a designated time, or may limitedly recognize and identify the faces of the persons who enter the designated distance from the electronic device 300. According to various embodiments, the processor 370 may recognize the face of the person (e.g., user) who approaches the electronic device 300, and distinguish the person from others. For example, the processor 370 may distinguish the user by using data corresponding to face identification information temporarily and/or permanently stored in the memory 380. According to various embodiments, the processor 370 may simply identify only whether one user is different from other users, and may continuously identify the user having data identified in the past. Further, the processor 370 may select, recognize, and identify only a specific user (e.g., manager).

With reference to step 420, according to various embodiments, the processor 370 may guide the user through identification of the optimum interaction place and/or direction.

According to various embodiments, the processor 370 may identify the optimum interaction place and/or direction. In order to perform the voice based interaction, it may be suitable for the electronic device 300 to perform the interaction in a low noise place or direction. The optimum interaction place and/or direction may be, for example, a place and/or direction at a low noise level. For example, the optimum interaction place and/or direction may be explained as the optimum interaction location. The optimum interaction location may include at least one of the optimum interaction direction and the optimum interaction place. According to various embodiments, the processor 370 may receive an audio signal outside the electronic device 300 by using the microphone 330. According to various embodiments, the microphone (e.g., microphone 330 of FIG. 3) may include a plurality of microphones, and the plurality of microphones may be distributed and disposed at respective locations of the electronic device 300 to form a microphone array. According to various embodiments, the microphones 330 forming the microphone array may receive external audio signals, and generate noise level information including volume information, volume information by directions, and volume information for each location. According to various embodiments, the processor 370 may identify the optimum interaction place and/or direction corresponding to the location and/or direction at low noise level by using the noise level information. According to various embodiments, the processor 370 may receive the noise level information from the outside (e.g., sensor server). For example, a sensor matrix disposed at respective locations in the same space as that of the electronic device 300 may measure the noise levels for each location in the corresponding space, generate the noise level information as the result of measuring the noise levels for each location, and transmit the noise level information to the sensor server and/or the electronic device 300. The processor 370 may receive the noise level information from the sensor server and/or the sensor matrix, and identify the optimum interaction place and/or direction by using the received noise level information. According to various embodiments, while the processor 370 does not perform the interaction with the user, it may move in the designated space periodically and/or repeatedly by controlling the driving module (e.g., driving module 360 of FIG. 3), receive the audio signal by controlling the microphone 330, and transmit the location information and the audio signal to the server (e.g., sensor server). The server may generate the noise level information in accordance with the noise levels for each location by using the location information and the audio signal that are transmitted by the processor 370, and transmit the generated noise level information to the processor 370. The processor 370 may identify the optimum interaction place and/or direction by using the noise level information received from the server.

According to various embodiments, the processor 370 may guide the user toward the optimum interaction place and/or direction. According to various embodiments, the processor 370 may allow the user to recognize the optimum interaction place and/or direction by outputting information on the identified optimum interaction place and/or direction to the display module (e.g., display module 340 of FIG. 3). For example, the processor 370 may output a message for movement to the optimum interaction place to the display module 340. According to various embodiments, the processor 370 may guide the user toward the optimum interaction place and/or direction by outputting the information on the optimum interaction place and/or direction and/or a message for movement toward the optimum interaction place and/or direction to the speaker (e.g., speaker 350 of FIG. 3). According to various embodiments, the processor 370 may guide the user toward the optimum interaction place and/or direction by moving and/or rotating the electronic device 300 by controlling the driving module 360.

With reference to step 430, the processor 370 may identify whether the voice interaction condition is satisfied. For example, the voice interaction condition may be the condition regarding whether it is suitable for the electronic device 300 to perform the voice based interaction directly with the user (e.g., user 220 of FIGS. 2A and 2B). According to various embodiments, the voice interaction condition may be identified based on at least one of noise level information, density level information, content sensitivity information, and user selection information. According to an embodiment, the noise level information, the density level information, the content sensitivity information, and the user selection information may mean context information. For example, the context information may include at least one of the noise level information, the density level information, the content sensitivity information, and the user selection information. According to various embodiments, the processor 370 may determine whether the voice interaction condition is satisfied based on the context information. The noise level information may be, for example, noise level information in a place where the interaction is performed. It may not be easy to detect and analyze the user voice from the audio signal received in a noisy place. Due to the noise, the recognition rate for the user voice may be low, and in case of the noisy place, it may not be suitable to directly perform the voice interaction, and it may be determined that the voice interaction condition is not satisfied. According to various embodiments, the processor 370 may obtain the noise level information, and identify whether the voice interaction condition is satisfied based on the obtained noise level information. For example, the density level information may mean the degree of concentration of persons around excluding the user. In a place crowded with many persons, the user may be reluctant to perform the voice interaction directly with the electronic device 300, or may feel inconvenience. According to various embodiments, the processor 370 may identify the persons around the electronic device 300 and their locations excluding the user 220 by analyzing the image captured in the surrounding environment by using the camera module (e.g., camera module 320 of FIG. 3), and generate the density level information by calculating the number of identified persons and the density based on the number and the locations of the persons. Further, the density level information may be received from the outside (e.g., sensor server). According to various embodiments, the processor 370 may identify whether the voice interaction condition is satisfied based on the obtained density level information. According to various embodiments, if the density level is high, the processor 370 may identify that the voice interaction condition is not satisfied. The content sensitivity information may mean the sensitivity of information which is provided by the user or which can be provided to the user by the electronic device 300 in case that information that may be sensitive to the user 220 should be based during the operation of the electronic device 300 being scheduled or performed. For example, the content sensitivity information may mean the sensitivity of the information (e.g., content) that should be provided by the user for the operation of the electronic device 300. In case that the user should provide, to the electronic device 300, the information which the user may be reluctant to publicly pronounce in public places (e.g., personal information such as the date of birth), and in case of information that may provide shame or embarrassment personally and/or socially, the content sensitivity may be high, and the direct voice interaction may be avoided with respect to the content having high sensitivity. According to various embodiments, the content sensitivity information may be stored in the memory (e.g., memory 380 of FIG. 3), and in case that the content sensitivity is high based on the content sensitivity information, the processor 370 may identify that the voice interaction condition is not satisfied. The user selection information may mean, for example, information selected by the user for the method for performing the voice interaction. For example, the user may select whether to selectively perform the direct voice interaction with the electronic device 300 or whether to perform the interaction using the external electronic device (e.g., external electronic device 230 of FIG. 2B), and the processor 370 may receive the user selection information regarding the selection from the user. The processor 370 may receive the user's touch input from the display module 340, or receive the user selection information through recognition of the user voice. According to various embodiments, if the user intends to receive the external interaction information using the external electronic device (e.g., external electronic device 230 of FIG. 2B), the processor 370 may recognize this, and identify information on the corresponding intention as the user selection information. According to various embodiments, if the recognition of the user voice has failed, if a voice recognition failure message is received from the voice recognition server (e.g., voice recognition server 240 of FIGS. 2A and 2B), or if the voice recognition failure occurs or the voice recognition failure message is received over a designated number of times, the processor 370 may determine that it is suitable to perform the interaction using the external electronic device 230, and identify the voice interaction condition by including the information on the voice recognition failure in the user selection information.

With reference to step 440, if it is identified that the voice interaction condition is satisfied, the processor 370 may receive the user voice, and transmit the received user voice to the voice recognition server. According to various embodiments, if the voice interaction condition is satisfied, the processor 370 may receive the user voice from the microphone 330. According to various embodiments, if the voice interaction condition is satisfied, the processor 370 may transmit the received user voice to the voice recognition server (e.g., voice recognition server 240 of FIGS. 2A and 2B), and receive the analyzed user voice analysis information from the voice recognition server. According to various embodiments, the processor 370 may perform at least one operation based on the received voice analysis information.

With reference to step 450, if the voice interaction condition is not satisfied, the processor 370 may perform the interaction with the user 220 through the external electronic device 230. According to various embodiments, the processor 370 may output the external interaction information outside the electronic device 300. The external interaction information may be, for example, an address, an access code, and/or identification information designated on the network server (e.g., network server 250 of FIG. 2B). According to various embodiments, instead of directly performing the interaction with the user 220, the electronic device 210 may output the address information or link information for enabling the external electronic device 230 to access a web page designated on the network server 250. According to an embodiment, the external interaction information may be one-time information. For example, if it is determined that the voice interaction condition is not satisfied, the processor 370 may generate new external interaction information. As another example, the external interaction information may be deleted after a predetermined time elapses after being generated or outputted, or may be deactivated to block the access from the outside (e.g., electronic device 300). Further, the external interaction information may be deleted or deactivated when a predetermined condition is satisfied.

According to various embodiments, the processor 370 may output the external interaction information through the short range wireless communication by controlling the communication module (e.g., communication module 310 of FIG. 3). According to various embodiments, the communication module 310 may support the short range wireless communication, for example, Bluetooth, Bluetooth low energy (BLE), near field communication (NFC), wireless fidelity (Wi-Fi) direct, infrared data association (IrDA), and/or ultra-wideband (UWB), and the processor 370 may output the external interaction information to the outside by using the short range wireless communication. According to various embodiments, the processor 370 may input and/or update the external interaction information on the NFC tag provided in the communication module 310. For example, the processor 370 may write designated information onto the NFC tag, and the signal output may be performed in a manner that the NFC tag having received energy by an electromagnetic field emitted from the external electronic device 230 emits a signal caused by the electromagnetic induction. According to various embodiments, the processor 370 may output a message for guiding the user to receive the external interaction information by using the display module 340 and/or the speaker (e.g., speaker 350 of FIG. 3), and the external electronic device 230 may receive the external interaction information by using the NFC tagging. According to various embodiments, the processor 370 may be connected to the external electronic device 230 by using the UWB communication, and transmit the external interaction information to the external electronic device 230. According to various embodiments, the processor 370 may generate the quick response (QR) code including the external interaction information. According to various embodiments, the processor 370 may generate the QR code including the external interaction information, and output the QR code by controlling the display module 340. According to various embodiments, the processor 370 may output the message for guiding the user to receive the external interaction information by using the display module 340 and/or the speaker 350, and the external electronic device 230 may receive the external interaction information through capturing and recognizing the QR code.

With reference to step 460, the processor 370 may receive user voice analysis information form the voice recognition server 240. According to various embodiments, the external electronic device 230 may perform the connection with the network server 250 by using the external interaction information. The external electronic device 230 may input and transmit the user voice on the user interface provided by the network server 250. According to various embodiments, the web page provided by the network server 250 may include the user interface for receiving the user input, and the user input that can be received may include the user voice, the input related to the operation of the electronic device 300, and the keyboard input. According to various embodiments, the network server 250 may receive the user input (e.g., user voice) from the external electronic device 230 connected thereto, and transmit the received input to the voice recognition server 240 and/or the electronic device 300. The processor 370 may receive the voice analysis information generated by the voice recognition server 240 having received the user voice through the network server 250 from the voice recognition server 240. According to various embodiments, the processor 370 may directly receive the user input from the network server 250.

With reference to step 470, the processor 370 may perform at least one operation based on the voice analysis information received from the voice recognition server 240. According to various embodiments, the processor 370 may perform at least one operation based on the user input received from the network server 250. The at least one operation that is performed by the processor 370 based on the user input and/or the user voice analysis information may be at least one of the movement, rotation, audio signal output, and display output of the electronic device. For example, the processor 370 may provide a guide service or a customer service including at least one of such operations based on the user voice analysis information.

Figure 5A:
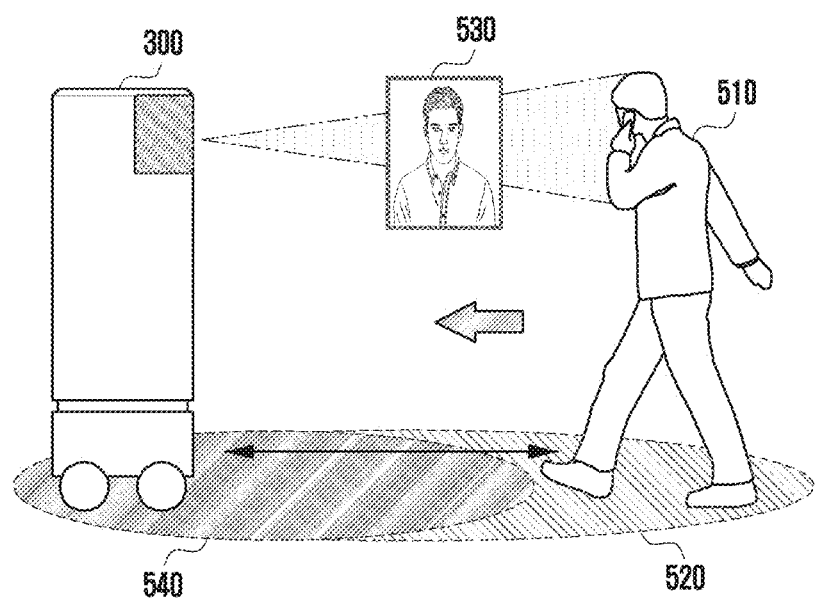
FIG. 5A is a diagram explaining an operation in which an electronic device guides a user toward an optimum interaction place and/or direction according to various embodiments.
Figure 5B:
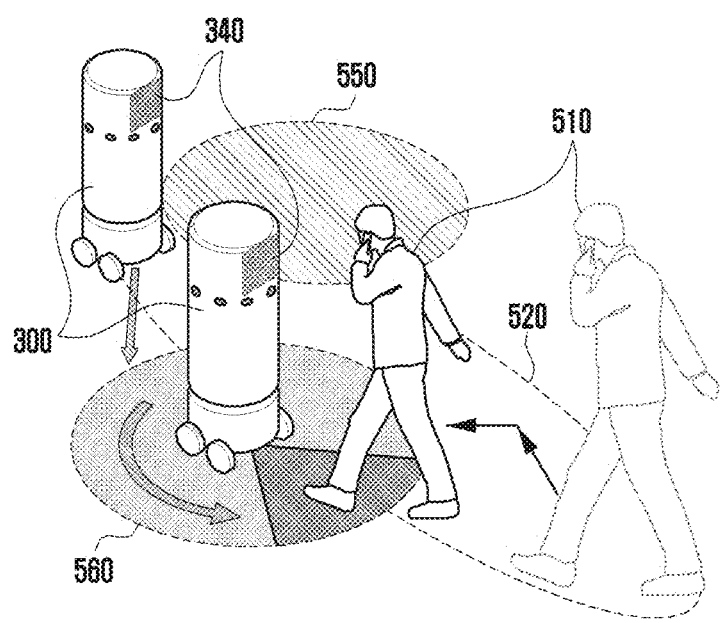
FIG. 5B is a diagram explaining an operation in which an electronic device guides a user toward an optimum interaction place and/or direction according to various embodiments.

FIGS. 5A and 5B are diagrams explaining an operation in which an electronic device guides a user toward an optimum interaction place and/or direction according to various embodiments.

With reference to FIG. 5A, the electronic device 300 may determine whether a user 510 accesses. The electronic device 300 may receive the image obtained by capturing an image of the outside of the electronic device 300 from the camera module (e.g., camera module 320 of FIG. 3). According to various embodiments, the processor 370 may make the camera module 320 operate continuously and/or periodically, and receive image information captured continuously and/or periodically by the camera module 320. According to various embodiments, the electronic device 300 may capture an image of the outside by using the camera module 320, and determine whether the user accesses by analyzing the image of a person present in the image. For example, the electronic device 300 may analyze the image captured by using the camera module 320 in real time, or transmit the captured image to the external server, so that the external server may receive the data analyzed in real time. According to various embodiments, if the person recognized in the captured image enters a designated first radius (not illustrated) from the electronic device 300, the electronic device 300 may continuously track the image 530 of the recognized person. The first radius may mean, for example, the radius that is the starting point for the electronic device 300 to continuously track the image 530 of the person having captured the image of the user 510. According to various embodiments, while tracking the image 530 of the person having entered the designated first radius (not illustrated), the electronic device 300 may determine whether the corresponding person has reached the distance (e.g., second radius 520) in which the electronic device 300 is highly likely to perform the interaction with the corresponding person, and may start identifying of the optimum interaction place and/or direction. The second radius 520 may correspond to, for example, a closer distance than the first radius, and may be the distance in which it is determined that the user 510 accesses the electronic device 300 with an intention of interaction with the electronic device 300. The electronic device 300 may determine that the user 510 accesses with respect to the user having reached in the second radius 520. The electronic device 300 may determine whether the corresponding person having accessed in the second radius 520 has reached the distance (e.g., third radius 540) in which it is suitable for the electronic device 300 to start the user interaction, and perform the operation based on the corresponding determination. The third radius 540 may be, for example, a reference distance in which it is determined that the user 510 has completely accessed, and the interaction starts. According to various embodiments, the electronic device 300 may recognize the face of the recognized person from the image. For example, the electronic device 300 may analyze the captured image, recognize the person through the image analysis, and recognize and identify the face of the person. According to various embodiments, the electronic device 300 may recognize and identify all faces of the persons, who are present in the corresponding image by analyzing the captured image at a designated time, or may limitedly recognize and identify the faces of the persons who enter the designated distance (e.g., the first radius, the second radius, or the third radius) from the electronic device 300. According to various embodiments, the electronic device 300 may recognize the face of the person (e.g., user) who approaches the electronic device 300 based on the analysis of the image 530 of the person, and distinguish the person from others. For example, the electronic device 300 may distinguish the user by using data corresponding to face identification information temporarily and/or permanently stored in the memory 380. According to various embodiments, the electronic device 300 may simply identify only whether one user is different from other users, and may continuously identify the user having the data identified in the past. Further, the electronic device 300 may select, recognize, and identify only a specific user (e.g., manager).

With reference to FIG. 5B, the electronic device 300 may guide the user through identification of the optimum interaction place and/or direction in case that the user access is identified.

According to various embodiments, the electronic device 300 having identified the access of the user 510 may identify the optimum interaction place and/or direction 560. For example, if the user 510 accesses in the distance (e.g., second radius 520) in which it is determined that the user accesses, the electronic device 300 may identify the optimum interaction place and/or direction 560. In order to perform the voice based interaction, it may be suitable for the electronic device 300 to perform the interaction in a low noise place or direction. The optimum interaction place and/or direction 560 may be, for example, a place and/or direction at a low noise level. According to various embodiments, the electronic device 300 may guide the user 510 toward the optimum interaction place and/or direction 560. According to various embodiments, the electronic device 300 may allow the user 510 to recognize the optimum interaction place and/or direction 560 by outputting information on the identified optimum interaction place and/or direction 560 to the display module 340. For example, the electronic device 300 may output a message for movement to the optimum interaction place to the display module 340. According to various embodiments, the electronic device 300 may guide the user 510 toward the optimum interaction place and/or direction 560 by outputting the information on the optimum interaction place and/or direction 560 and/or a message for movement toward the optimum interaction place and/or direction 560 to the speaker 350. According to various embodiments, the electronic device 300 may guide the user 510 toward the optimum interaction place and/or direction 560 by moving and/or rotating the electronic device 300 by controlling the driving module (e.g., driving module 360 of FIG. 3). With reference to FIG. 5B, the user 510 who is moving to a place 550 in which it is not suitable to perform the interaction may recognize the guide of the electronic device 300, and change the direction.

Figure 6A:
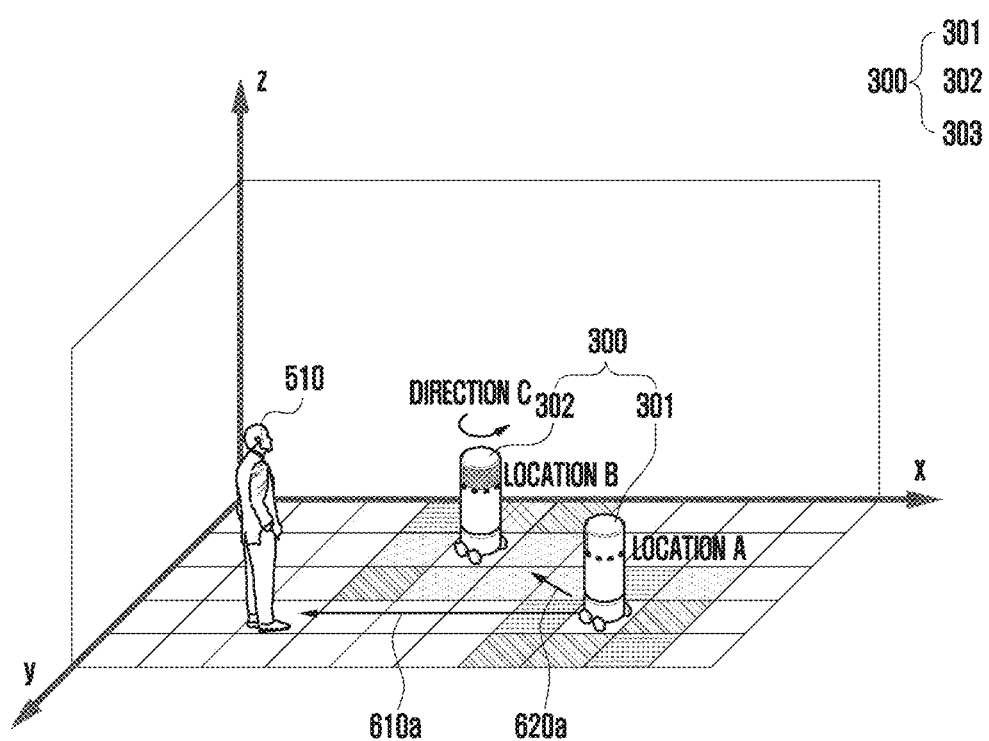
FIG. 6A is a diagram explaining an operation in which an electronic device guides a user toward an optimum interaction place and/or direction according to various embodiments.
Figure 6B:
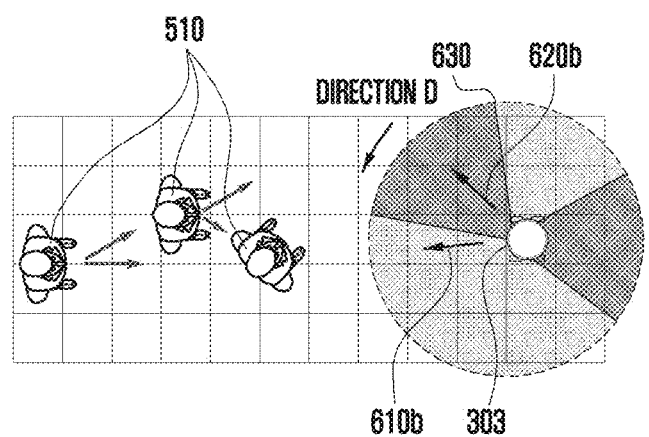
FIG. 6B is a diagram explaining an operation in which an electronic device guides a user toward an optimum interaction place and/or direction according to various embodiments.

FIGS. 6A and 6B are diagrams explaining an operation in which an electronic device guides a user toward an optimum interaction place and/or direction according to various embodiments.

According to various embodiments, the electronic device 300 may receive an audio signal outside the electronic device 300 by using the microphone (e.g., microphone 330 of FIG. 3). According to various embodiments, the microphone 330 may include a plurality of microphones, and the plurality of microphones may be distributed and disposed at respective locations of the electronic device 300 to form a microphone array. According to various embodiments, the microphones 330 forming the microphone array may receive external audio signals from the microphone 330 forming the microphone array, and generate noise level information including volume information, volume information by directions, and volume information for each location. According to various embodiments, the electronic device 300 may identify the optimum interaction place and/or direction corresponding to the location and/or direction at low noise level by using the noise level information.

With reference to FIG. 6A, the electronic device 301 having identified the access of the user 510 may identify the identified optimum interaction place and/or direction, and guide the user through movement and/or rotation thereof. With further reference to FIG. 6A, the electronic device 301 may not move toward a location A direction 610a that is the place requiring the shortest distance to move to the user 510, but may move toward a location B direction 620a determined as the optimum interaction place. The electronic device 302 having moved to the location B direction may rotate toward a direction C.

With reference to FIG. 6B, in order to guide the user 510 toward the optimum interaction place and/or direction through change of the direction in which the user 510 accesses previously, the electronic device 303 may move toward to a movement direction 610b that is changed from the exiting movement direction 610b, and may rotate in a direction D.

Figure 7A:
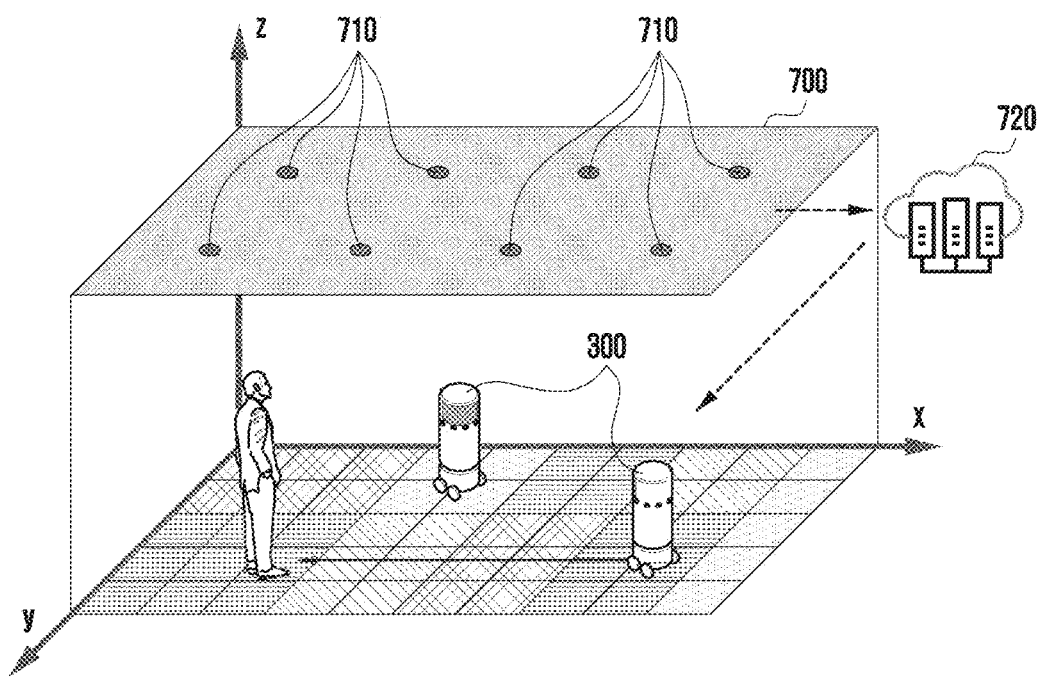
FIG. 7A is a diagram explaining a method in which an electronic device identifies an optimum interaction place and/or direction according to various embodiments.
Figure 7B:
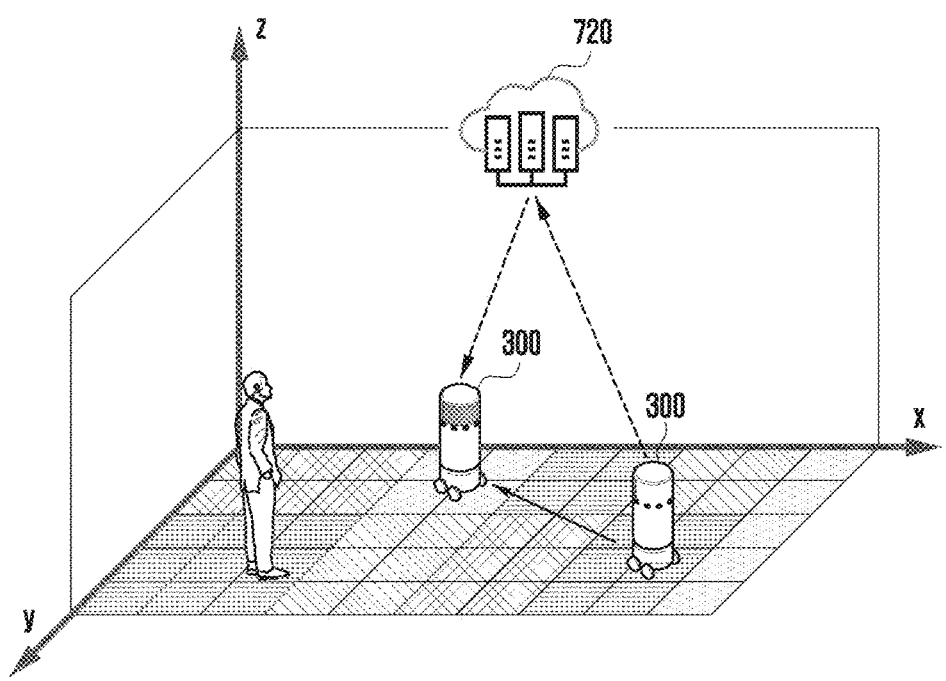
FIG. 7B is a diagram explaining a method in which an electronic device identifies an optimum interaction place and/or direction according to various embodiments.

FIGS. 7A and 7B are diagrams explaining a method in which an electronic device identifies an optimum interaction place and/or direction according to various embodiments.

With reference to FIG. 7A, the electronic device 300 may receive the noise level information from the outside (e.g., from a sensor server 720). For example, a sensor matrix 700 disposed at respective locations in the same space as that of the electronic device 300 may measure the noise levels for each location in the corresponding space, generate the noise level information as the result of measuring the noise levels for each location, and transmit the noise level information to the sensor server 720 and/or the electronic device 300. According to various embodiments, the sensor matrix 700 may be a set of a plurality of sensor devices 710 distributed for each location in the same space as that of the electronic device 300. For example, the plurality of sensor devices 710 may receive the audio signals at the respective locations, and measure the noise levels. Further, the plurality of sensor devices 710 may measure the density levels representing the degrees of density of crowded persons in the space by using image and/or infrared sensors at the respective locations. The electronic device 300 may receive the noise level information from the sensor server 720 and/or the sensor matrix 700, and identify the optimum interaction place and/or direction by using the received noise level information.

With reference to FIG. 7B, according to various embodiments, while the electronic device 300 does not perform the interaction with the user, it may move in the designated space periodically and/or repeatedly by controlling the driving module (e.g., driving module 360 of FIG. 3), receive the audio signal by controlling the microphone (e.g., microphone 330 of FIG. 3), and transmit the location information and the audio signal to the server (e.g., sensor server 720). The sensor server 720 may generate the noise level information in accordance with the noise levels for each location by using the location information and the audio signal that are transmitted by the electronic device 300, and transmit the generated noise level information to the electronic device 300. The electronic device 300 may identify the optimum interaction place and/or direction by using the noise level information received from the sensor server 720.

Figure 8:
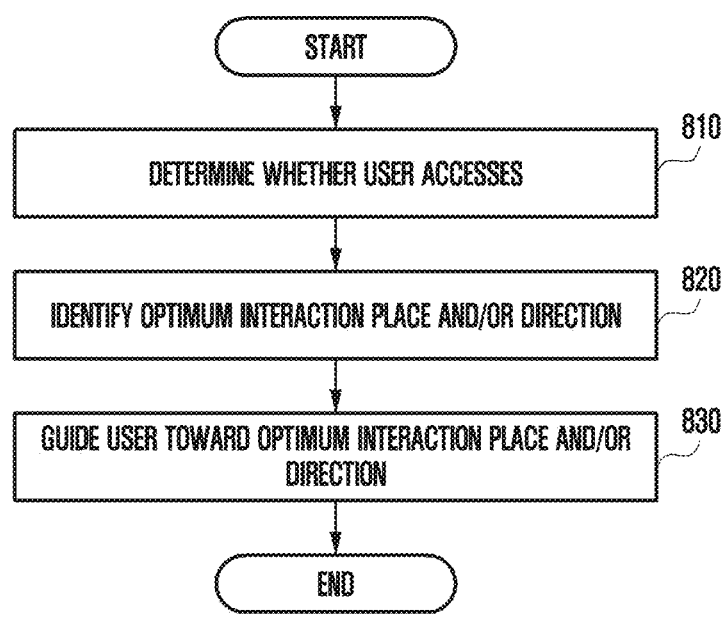
FIG. 8 is an operational flowchart in which an electronic device guides a user toward an optimum interaction place and/or direction according to various embodiments.

FIG. 8 is an operational flowchart in which an electronic device guides a user toward an optimum interaction place and/or direction according to various embodiments.

With reference to FIG. 8, operations for the electronic device (e.g., electronic device 101 of FIG. 1, electronic device 210 of FIGS. 2A and 2B, and/or the electronic device 300 of FIG. 3) to guide the user toward the optimum interaction place and/or direction may be understood as the operations being performed by the processor (e.g., processor 120 of FIG. 1 and/or the processor 370 of FIG. 3) included in the electronic device.

With reference to step 810, the processor 370 may determine whether the user accesses. The processor 370 may receive the image obtained by capturing an image outside the electronic device 300 from the camera module (e.g., camera module 320 of FIG. 3). According to various embodiments, the processor 370 may make the camera module 320 operate continuously and/or periodically, and receive image information captured continuously and/or periodically by the camera module 320. According to various embodiments, the processor 370 may capture an external image by using the camera module 320, and determine whether the user accesses by analyzing the image of a person present in the image. For example, the processor 370 may analyze the image captured by using the camera module 320 in real time, or transmit the captured image to the external server, so that the external server may receive the data analyzed in real time. According to various embodiments, if the person recognized in the captured image enters a designated radius from the electronic device 300, the processor 370 may continuously track the image of the recognized person. According to various embodiments, while tracking the image of the person having entered the designated radius, the processor 370 may determine whether the corresponding person has reached the distance in which it is suitable for the electronic device 300 to start the user interaction, and perform the operation based on the corresponding determination. According to various embodiments, the processor 370 may recognize the face of the recognized person from the image. For example, the processor 370 may analyze the captured image, recognize the person through the image analysis, and recognize and identify the face of the person. According to various embodiments, the processor 370 may recognize and identify all faces of persons, who are present in the corresponding image by analyzing the captured image at a designated time, or may limitedly recognize and identify the faces of the persons who enter the designated distance from the electronic device 300. According to various embodiments, the processor 370 may recognize the face of the person (e.g., user) who approaches the electronic device 300, and distinguish the person from others. For example, the processor 370 may distinguish the user by using data corresponding to face identification information temporarily and/or permanently stored in the memory 380. According to various embodiments, the processor 370 may simply identify whether one user is different from other users, and may continuously identify the user having data identified in the past. Further, the processor 370 may select, recognize, and identify only a specific user (e.g., manager).

With reference to step 820, the processor 370 may identify the optimum interaction place and/or direction. In order to perform the voice based interaction, it may be suitable for the electronic device 300 to perform the interaction in a low noise place or direction. The optimum interaction place and/or direction may be, for example, a place and/or direction at a low noise level. For example, the optimum interaction place and/or direction may be explained as the optimum interaction location. The optimum interaction location may include at least one of the optimum interaction direction and the optimum interaction place. According to various embodiments, the processor 370 may receive an audio signal outside the electronic device 300 by using the microphone 330. According to various embodiments, the microphone 330 may include a plurality of microphones, and the plurality of microphones may be distributed and disposed at respective locations of the electronic device 300 to form a microphone array. According to various embodiments, the microphones 330 forming the microphone array may receive external audio signals, and generate noise level information including volume information, volume information by directions, and volume information for each location. According to various embodiments, the processor 370 may identify the optimum interaction place and/or direction corresponding to the location and/or direction at low noise level by using the noise level information. According to various embodiments, the processor 370 may receive the noise level information from the outside (e.g., sensor server). For example, a sensor matrix (e.g., sensor matrix 700 of FIG. 7A) disposed at respective locations in the same space as that of the electronic device 300 may measure the noise levels for each location in the corresponding space, generate the noise level information as the result of measuring the noise levels for each location, and transmit the noise level information to the sensor server (e.g., sensor server 720 of FIG. 7A) and/or the electronic device 300. The processor 370 may receive the noise level information from the sensor server 720 and/or the sensor matrix 700, and identify the optimum interaction place and/or direction by using the received noise level information. According to various embodiments, while the processor 370 does not perform the interaction with the user, it may move in the designated space periodically and/or repeatedly by controlling the driving module (e.g., driving module 360 of FIG. 3), receive the audio signal by controlling the microphone 330, and transmit the location information and the audio signal to the server (e.g., sensor server 720). The sensor server 720 may generate the noise level information in accordance with the noise levels for each location by using the location information and the audio signal that are transmitted by the processor 370, and transmit the generated noise level information to the processor 370. The processor 370 may identify the optimum interaction place and/or direction by using the noise level information received from the sensor server 720.

With reference to step 830, the processor 370 may guide the user toward the optimum interaction place and/or direction. According to various embodiments, the processor 370 may allow the user to recognize the optimum interaction place and/or direction by outputting information on the identified optimum interaction place and/or direction to the display module 340. For example, the processor 370 may output a message for movement to the optimum interaction place to the display module (e.g., display module 340 of FIG. 3). According to various embodiments, the processor 370 may guide the user toward the optimum interaction place and/or direction by outputting the information on the optimum interaction place and/or direction and/or a message for movement toward the optimum interaction place and/or direction to the speaker (e.g., speaker 350 of FIG. 3). According to various embodiments, the processor 370 may guide the user toward the optimum interaction place and/or direction by moving and/or rotating the electronic device 300 by controlling the driving module 360.

Figure 9A:
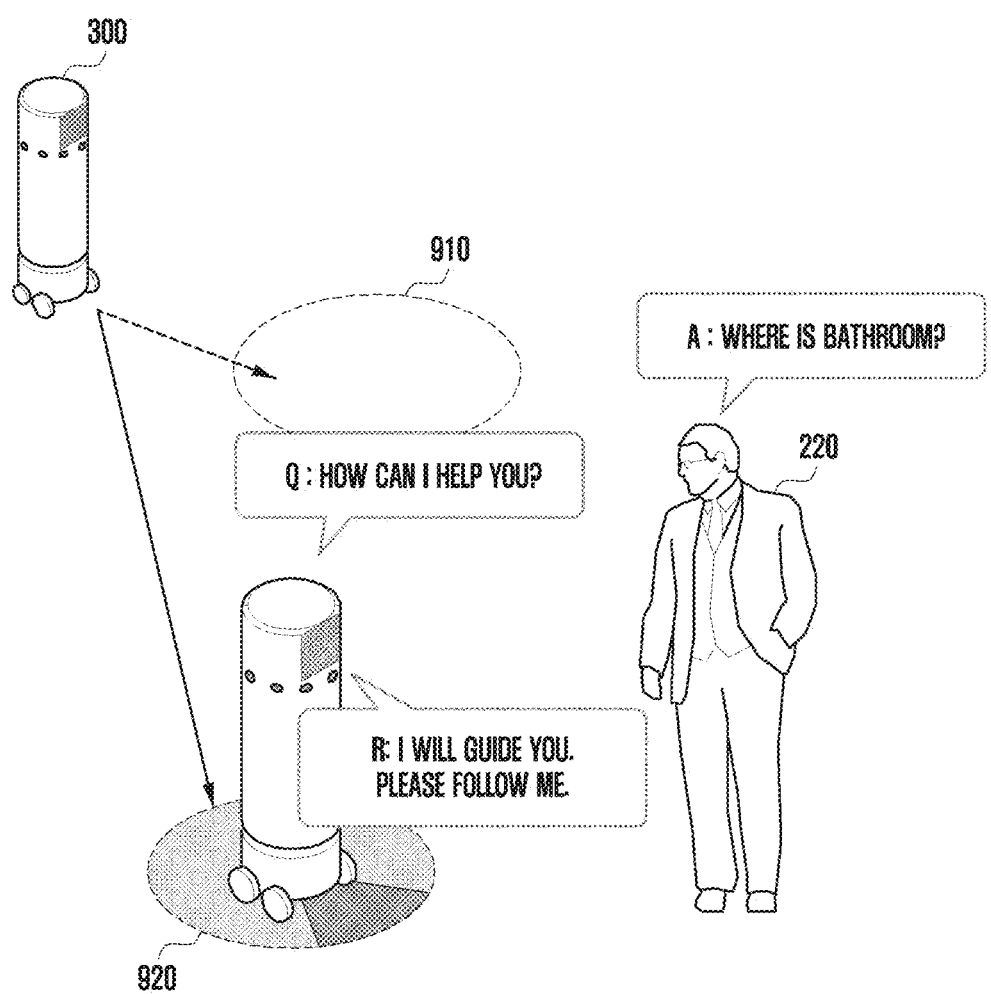
FIGS. 9A, 9B, and 9C are diagrams explaining a voice interaction condition according to various embodiments.
Figure 9B:
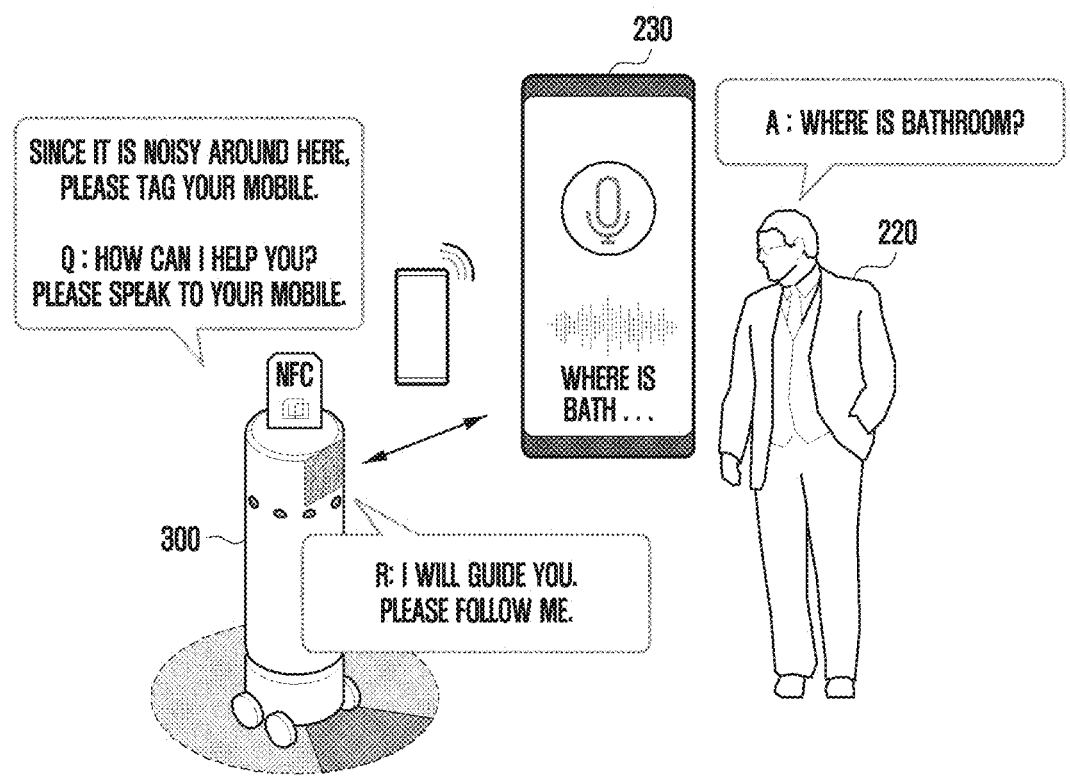
Figure 9C:
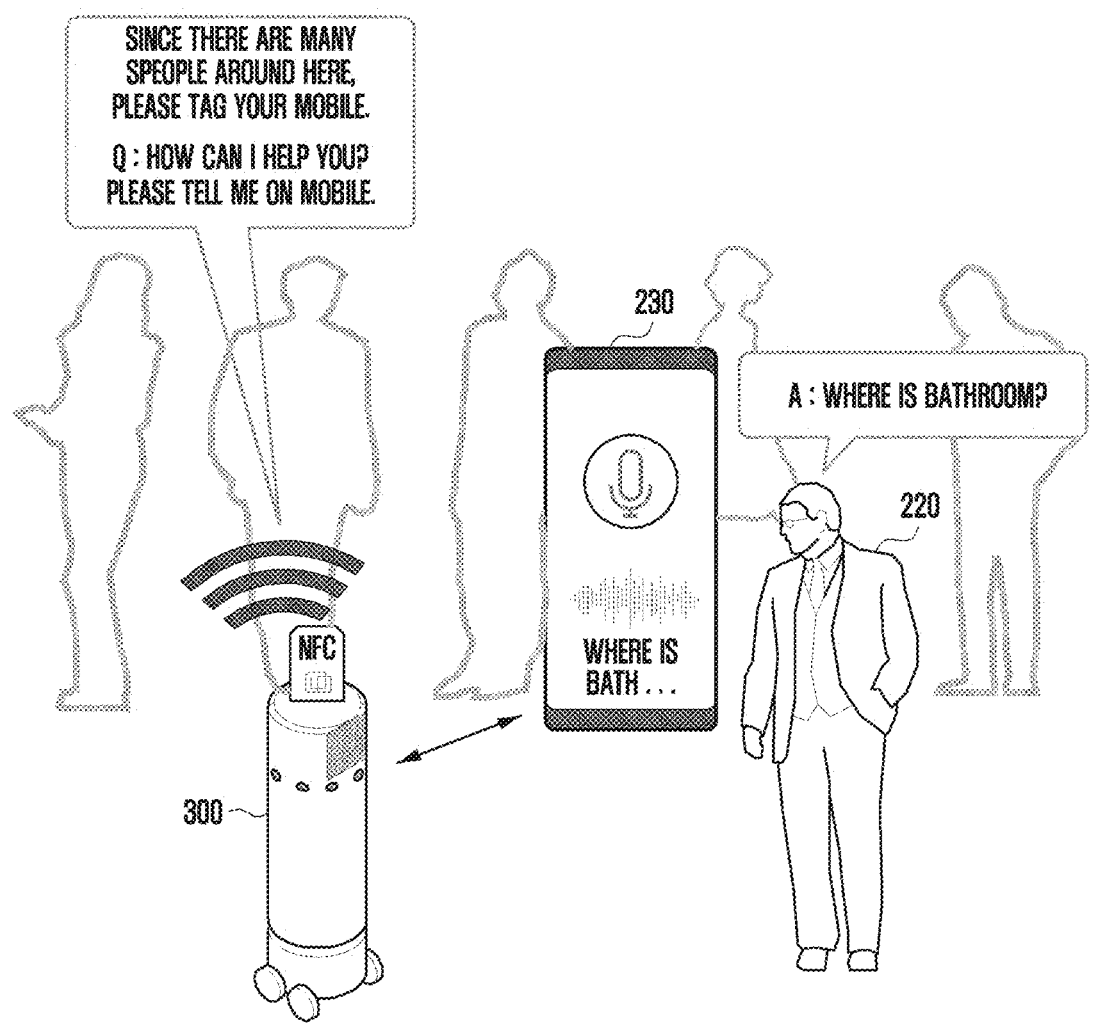

FIGS. 9A, 9B, and 9C are diagrams explaining a voice interaction condition according to various embodiments.

Figure 10A:
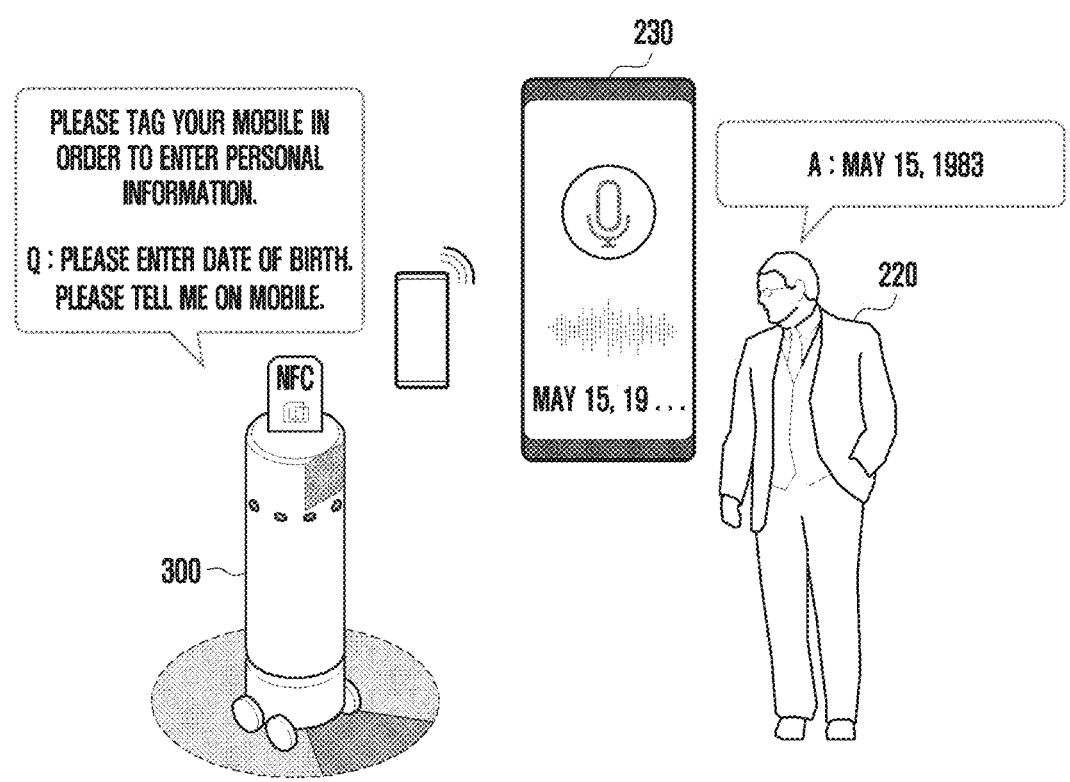
FIGS. 10A, 10B, and 10C are diagrams explaining a voice interaction condition according to various embodiments.
Figure 10B:
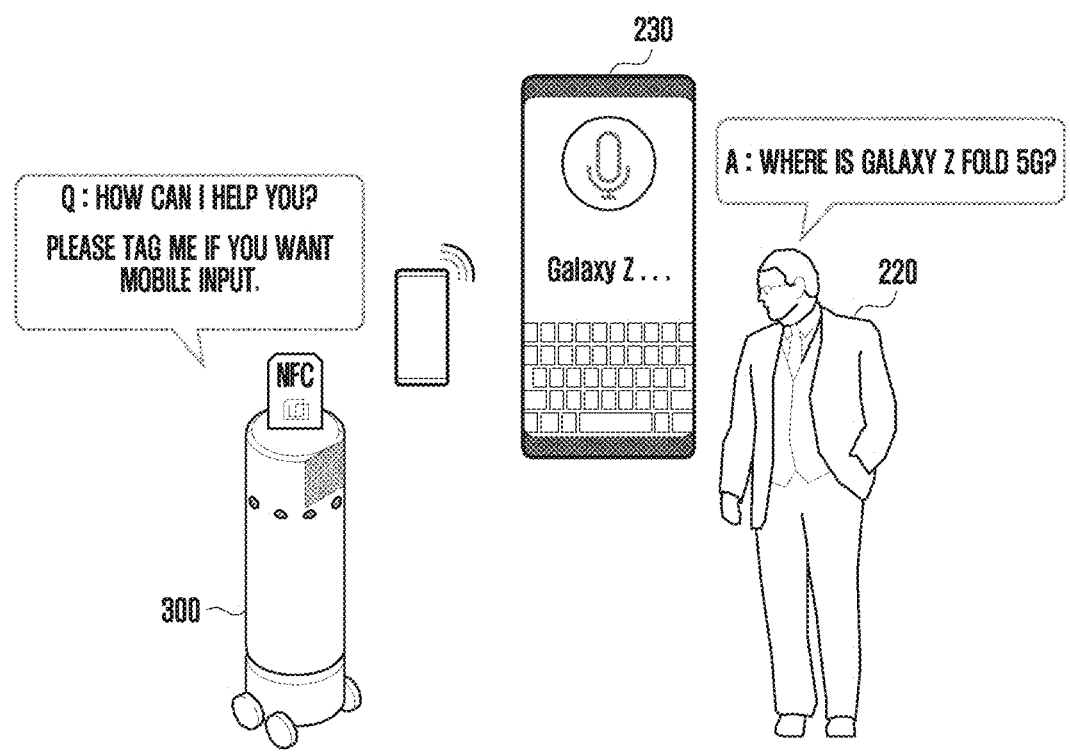
Figure 10C:
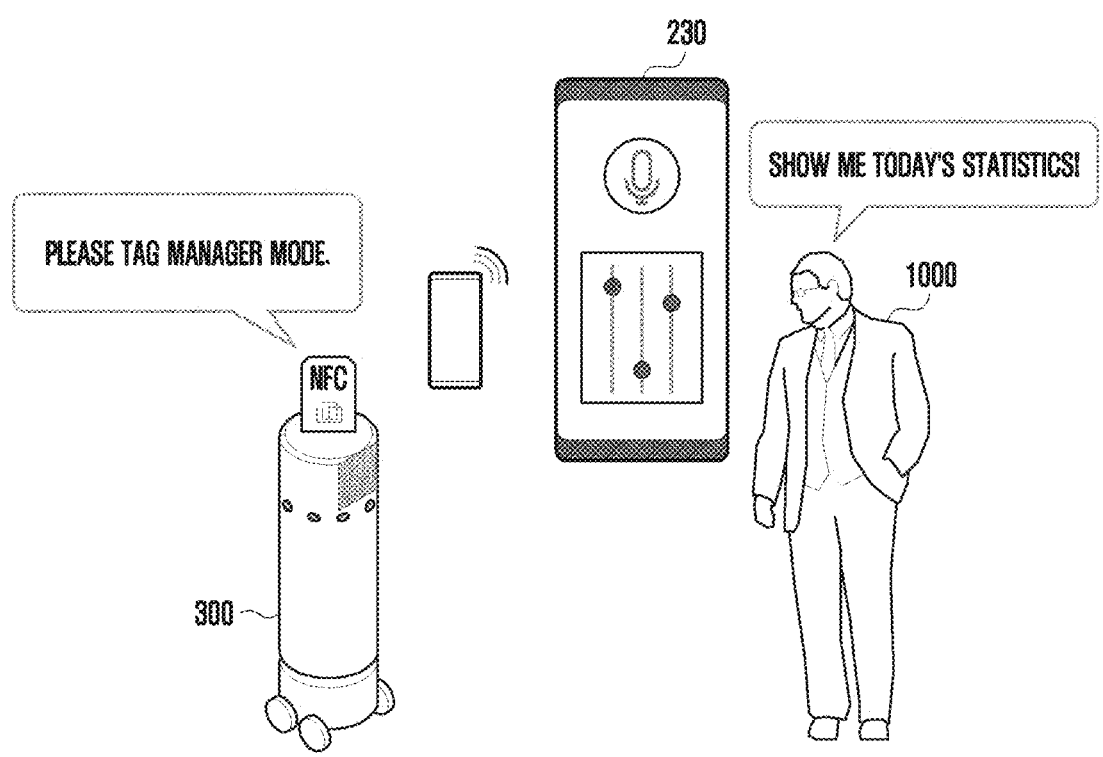

FIGS. 10A, 10B, and 10C are diagrams explaining a voice interaction condition according to various embodiments.

With reference to FIGS. 9A, 9B, 9C, 10A, 10B, and 10C, the electronic device 300 may directly receive the user voice from the user 220 and provide the voice interaction, or may receive the user voice transmitted by the user 220 by using the external electronic device 230 and/or information obtained by analyzing the user voice and provide the interaction.

With reference to FIGS. 9A, 9B, 9C, 10A, 10B, and 10C, according to various embodiments, the electronic device 300 may identify whether the voice interaction condition is satisfied. For example, the voice interaction condition may be the condition regarding whether it is suitable for the electronic device 300 to perform the voice based interaction directly with the user 220. According to various embodiments, the voice interaction condition may be identified based on at least one of noise level information, density level information, content sensitivity information, and user selection information. According to an embodiment, the noise level information, the density level information, the content sensitivity information, and the user selection information may mean context information. For example, the context information may include at least one of the noise level information, the density level information, the content sensitivity information, and the user selection information. According to various embodiments, the electronic device 300 may determine whether the voice interaction condition is satisfied based on the context information.

With reference to FIG. 9A, the electronic device 300 may identify the access of the user, and the electronic device 300 having identified the access may identify the optimum interaction place and/or direction 920. For example, if the user 220 accesses in the distance (e.g., second radius 520 of FIGS. 5A and 5B) in which it is determined that the user accesses, the electronic device 300 may identify the optimum interaction place and/or direction 920. In order to perform the voice based interaction, it may be suitable for the electronic device 300 to perform the interaction in a low noise place or direction. The optimum interaction place and/or direction 920 may be, for example, a place and/or direction at a low noise level. According to various embodiments, the electronic device 300 may guide the user 220 toward the optimum interaction place and/or direction 920. The user 220 who is moving to a place 910 that is not suitable for the interaction may recognize the guide of the electronic device 300, and change the direction. According to various embodiments, when the user 220 arrives at the optimum interaction place and/or direction 920, the electronic device 300 may identify whether the voice interaction condition is satisfied. If the voice interaction condition is satisfied, the electronic device 300 may start the voice based interaction with the user 220.

With reference to FIGS. 9B, 9C, 10A, 10B, and 10C may correspond to cases where the voice interaction condition is not satisfied. According to various embodiments, if the voice interaction condition is not satisfied, the electronic device 300 may perform the interaction with the user 220 through the external electronic device 230. According to various embodiments, the electronic device 300 may output the external interaction information to the outside of the electronic device 300. The external interaction information may be, for example, an address, an access code, and/or identification information designated on the network server (e.g., network server 250 of FIG. 2B). According to various embodiments, instead of directly performing the interaction with the user 220, the electronic device 210 may output the address information or link information for enabling the external electronic device 230 to access a web page designated on the network server 250. According to an embodiment, the external interaction information may be one-time information. For example, if it is determined that the voice interaction condition is not satisfied, the electronic device 300 may generate new external interaction information. As another example, the external interaction information may be deleted when a predetermined time elapses after being generated or outputted, or may be deactivated to block the access from the outside (e.g., electronic device 300). Further, the external interaction information may be deleted or deactivated when a predetermined condition is satisfied. According to various embodiments, the electronic device 300 may support the short range wireless communication, for example, Bluetooth, Bluetooth low energy (BLE), near field communication (NFC), wireless fidelity (Wi-Fi) direct, infrared data association (IrDA), and/or ultra-wideband (UWB), and the electronic device 300 may output the external interaction information to the outside by using the short range wireless communication. According to various embodiments, the electronic device 300 may output a message for guiding the user to receive the external interaction information by using the display module 340 and/or speaker 350. According to various embodiments, the user 220 may transmit the user voice to the server (e.g., network server) or the electronic device 300 by using the external electronic device 230.

With reference to FIG. 9B, the voice interaction condition may be determined, based on the noise level information. The noise level information may be, for example, noise level information in a place where the interaction is performed. It may not be easy to detect and analyze the user voice from the audio signal received in a noisy place. Due to the noise, the recognition rate for the user voice may be low, and in case of the noisy place, it may not be suitable to directly perform the voice interaction, and it may be determined that the voice interaction condition is not satisfied. According to various embodiments, the electronic device 300 may obtain the noise level information, and identify whether the voice interaction condition is satisfied, based on the obtained noise level information.

With reference to FIG. 9C, the voice interaction condition may be determined, based on the density level information. For example, the density level information may mean the degree of concentration of persons in the surroundings, excluding the user. In a place crowded with many persons, the user may be reluctant to perform the voice interaction directly with the electronic device 300, or may feel inconvenience. According to various embodiments, the electronic device 300 may identify the persons present around the electronic device 300 and their locations excluding the user 220 by analyzing the image captured in the surrounding environment by using the camera module (e.g., camera module 320 of FIG. 3), and generate the density level information by calculating the number of identified persons and the density based on the number and the locations of the persons. Further, the density level information may be received from the outside (e.g., sensor server 720 of FIG. 7A). According to various embodiments, the electronic device 300 may identify whether the voice interaction condition is satisfied based on the obtained density level information. According to various embodiments, if the density level is high, the electronic device 300 may identify that the voice interaction condition is not satisfied.

With reference to FIG. 10A, the voice interaction condition may be determined based on the content sensitivity information. The content sensitivity information may mean, for example, the sensitivity of information which is provided by the user or which can be provided to the user by the electronic device 300 in case that information that may be sensitive to the user 220 should be based, during the operation of the electronic device 300 being scheduled or performed. For example, the content sensitivity information may mean the sensitivity of the information (e.g., content) that should be provided by the user for the operation of the electronic device 300. In case that the user should provide, to the electronic device 300, the information which the user may be reluctant to publicly pronounce in public places (e.g., personal information such as the date of birth), and in case of information that may provide shame or embarrassment personally and/or socially, the content sensitivity may be high, and the direct voice interaction may be avoided with respect to the content having high sensitivity. According to various embodiments, the content sensitivity information may be stored in the memory (e.g., memory 380 of FIG. 3), and in case that the content sensitivity is high based on the content sensitivity information, the electronic device 300 may identify that the voice interaction condition is not satisfied.

With reference to FIG. 10B, the voice interaction condition may be determined based on the user selection information. The user selection information may mean, for example, information selected by the user for the method for performing the voice interaction. For example, the user may select whether to selectively perform the direct voice interaction with the electronic device 300 or whether to perform the interaction using the external electronic device 230, and the electronic device 300 may receive the user selection information regarding the selection from the user. The electronic device 300 may receive the user's touch input from the display module (e.g., display module 340 of FIG. 3), or receive the user selection information through recognition of the user voice. According to various embodiments, if the user intends to receive the external interaction information using the external electronic device 230, the electronic device 300 may recognize this, and identify information on the corresponding intention as the user selection information. According to various embodiments, if the recognition of the user voice has failed, if a voice recognition failure message is received from the voice recognition server (e.g., voice recognition server 240 of FIGS. 2A and 2B), or if the voice recognition failure occurs or the voice recognition failure message is received over a designated number of times, the electronic device 300 may determine that it is suitable to perform the interaction using the external electronic device 230, and identify the voice interaction condition by including the information on the voice recognition failure in the user selection information.

With reference to FIG. 10C, the voice recognition condition may be determined based on the user recognition information. According to various embodiments, the electronic device 300 may recognize different users, and generate and/or update the external interaction information based on the user recognition. According to various embodiments, the electronic device 300 may recognize the face of the recognized person from the image. For example, the electronic device 300 may analyze the captured image, recognize the person through the image analysis, and recognize and identify the face of the person. According to various embodiments, the electronic device 300 may recognize and identify all the faces of the persons, who are present in the corresponding image by analyzing the captured image at a designated time, or may limitedly recognize and identify the faces of the persons who enter in the designated distance from the electronic device 300. According to various embodiments, the electronic device 300 may recognize the face of the person (e.g., user) who approaches the electronic device 300, and distinguish the person from others. For example, the electronic device 300 may distinguish the user by using the data corresponding to the face identification information temporarily and/or permanently stored in the memory 380. According to various embodiments, the electronic device 300 may simply identify whether one user is different from other users, and may continuously identify the user having the data identified in the past. Further, the electronic device 300 may select, recognize, and identify only a specific user (e.g., manager). According to various embodiments, the electronic device 300 may identify whether the voice interaction condition is satisfied based on the identified user recognition. For example, in case of the manager 1000, it may be efficient to interact with the electronic device 300 by using other methods in addition to the voice interaction. The manager 1000 may require a function that is different from the interaction with a general user with respect to the electronic device 300, such as identification of various kinds of data stored by the electronic device 300. According to various embodiments, if the user is recognized as the specific user as the result of the user recognition, the electronic device 300 may identify that the voice interaction condition is not satisfied. According to various embodiments, the electronic device 300 may identify whether the voice interaction condition is satisfied based on the user recognition information.

Figure 11A:
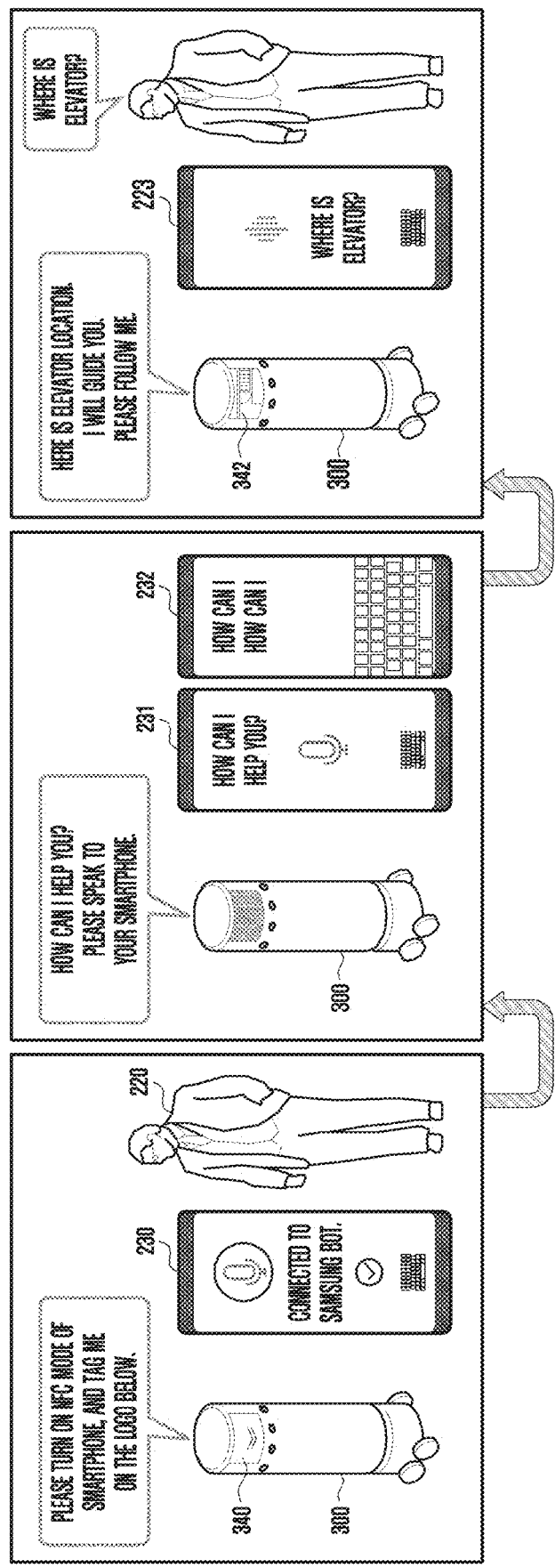
FIGS. 11A, 11B, and 11C are diagrams explaining an external interaction method according to various embodiments.
Figure 11B:
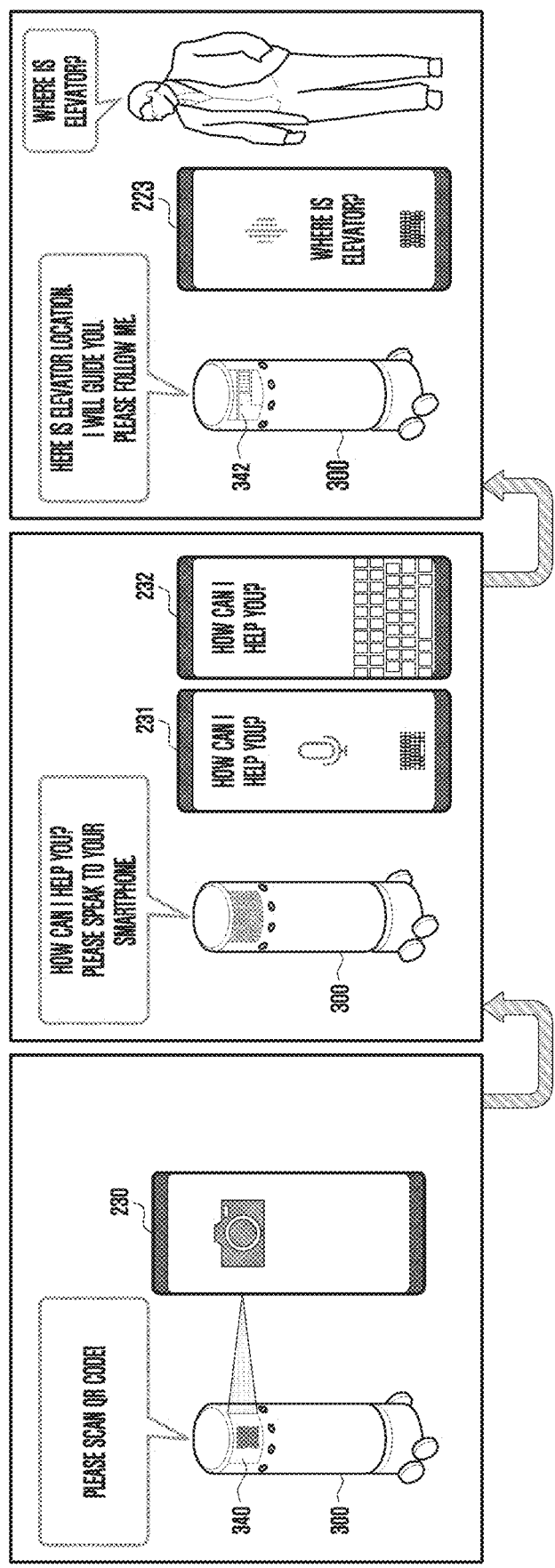
Figure 11C:
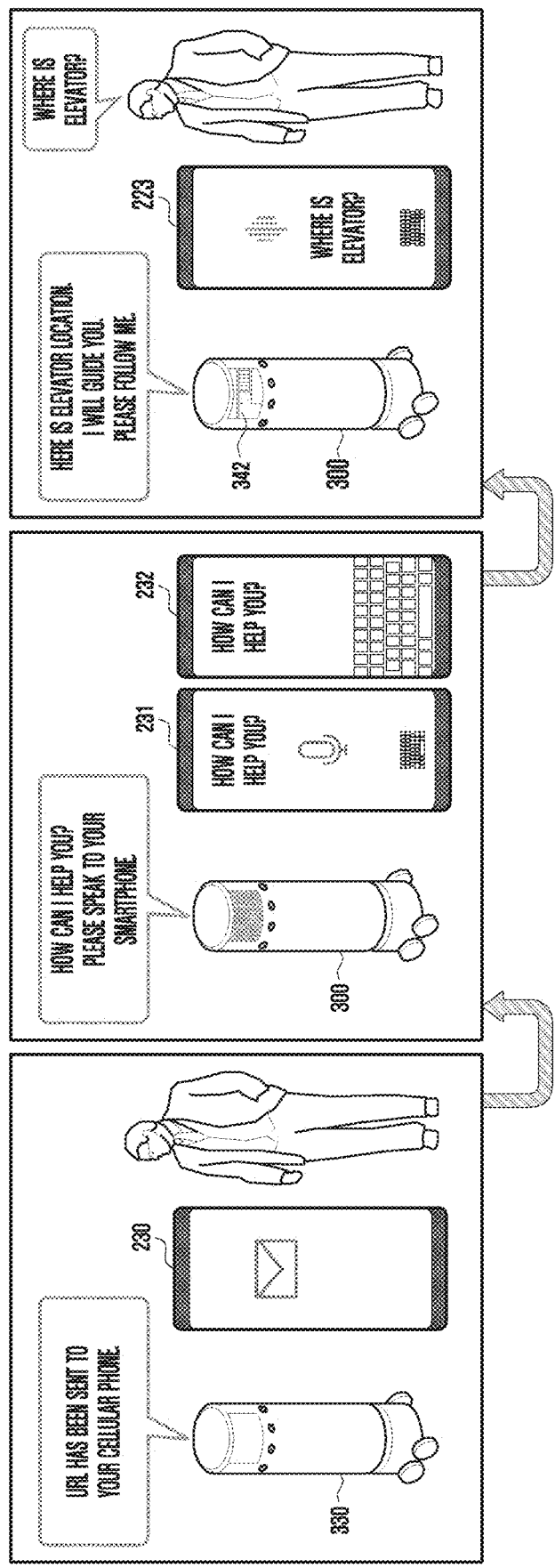

FIGS. 11A, 11B, and 11C are diagrams explaining an external interaction method according to various embodiments.

With reference to FIGS. 11A, 11B, and 11C, an external interaction method may mean a method for the electronic device 300 to provide the interaction to the user 220 through the external interaction information and the external electronic device 230.

According to various embodiments, if the voice interaction condition is not satisfied, the electronic device 300 may perform the interaction with the user 220 through the external electronic device 230. According to various embodiments, the electronic device 300 may output the external interaction information to the outside of the electronic device 300. The external interaction information may be, for example, an address, an access code, and/or identification information designated on the network server 250. According to various embodiments, instead of directly performing the interaction with the user 220, the electronic device 210 may output address information or link information for enabling the external electronic device 230 to access a web page designated on the network server 250.

According to various embodiments, the electronic device 300 may receive the user voice analysis information from the voice recognition server 240. According to various embodiments, the external electronic device 230 may perform connection with the network server 250 by using the external interaction information. The external electronic device 230 may input and transmit the user voice on user interfaces provided by the network server 250. According to various embodiments, the web page provided by the network server 250 may include a user interface for receiving the user input, and may include various interfaces, such as interfaces 231 and 233 for receiving the user voice, an interface for receiving an input related to the operation of the electronic device 300, and an interface 232 for receiving a keyboard input. According to various embodiments, the network server 250 may receive the user input (e.g., user voice) from the external electronic device 230 connected thereto, and transmit the received input to the voice recognition server 240 and/or the electronic device 300. The electronic device 300 may receive the voice analysis information generated by the voice recognition server 240 having received the user voice through the network server 250, from the voice recognition server 240. According to various embodiments, the electronic device 300 may directly receive the user input from the network server 250.

According to various embodiments, the electronic device 300 may perform at least one operation based on the voice analysis information received from the voice recognition server 240. According to various embodiments, the electronic device 300 may perform at least one operation based on the user input received from the network server 250. The at least one operation that is performed by the electronic device 300 based on the user input and/or the user voice analysis information may be at least one of the movement, rotation, audio signal output, and display output of the electronic device. For example, the electronic device 300 may provide a guide service or a customer service including at least one of such operations based on the user voice analysis information. For example, the electronic device 300 may output the recognized user voice as texts by controlling the display module 340, and output a guide image 341 to the display module 340 based on the user voice analysis information.

With reference to FIG. 11A, according to various embodiments, the electronic device 300 may output the external interaction information through the short range wireless communication by controlling the communication module 310. According to various embodiments, the communication module 310 may support the short range wireless communication, for example, Bluetooth, Bluetooth low energy (BLE), near field communication (NFC), wireless fidelity (Wi-Fi) direct, infrared data association (IrDA), and/or ultra-wideband (UWB), and the electronic device 300 may output the external interaction information to the outside by using the short range wireless communication. According to various embodiments, the electronic device 300 may input and/or update the external interaction information on the NFC tag provided in the communication module 310. For example, the electronic device 300 may write the designated information onto the NFC tag, and the signal output may be performed in a manner that the NFC tag having received energy by the electromagnetic field emitted from the external electronic device 230 emits the signal caused by the electromagnetic induction. According to various embodiments, the electronic device 300 may output the message for guiding the user to receive the external interaction information by using the display module 340 and/or the speaker 350, and the external electronic device 230 may receive the external interaction information by using the NFC tagging.

With reference to FIG. 11B, the electronic device 300 may be connected to the external electronic device 230 by using the UWB communication, and transmit the external interaction information to the external electronic device 230. According to various embodiments, the electronic device 300 may be connected to the external electronic device through the UWB communication network by controlling the communication module 310. According to various embodiments, the electronic device 300 may transmit the external interaction information to the external electronic device 230 by using the UWB communication.

With reference to FIG. 11C, the electronic device 300 may generate a quick response (QR) code including the external interaction information. According to various embodiments, the electronic device 300 may generate the QR code including the external interaction information, and output the QR code by controlling the display module 340. According to various embodiments, the electronic device 300 may output the message for guiding the user to receive the external interaction information by using the display module 340 and/or the speaker 350, and the external electronic device 230 may receive the external interaction information through capturing and recognizing the QR code.

FIGS. 12A, 12B, 12C, and 12D are diagrams explaining an interaction end condition according to various embodiments.

According to various embodiments, the electronic device 300 may determine whether the interaction end condition is satisfied. The interaction end condition may be the condition for determining whether the interaction through the electronic device 300 and the user's external electronic device (e.g., external electronic device 230 of FIG. 2B) is ended. The interaction may be an action of exchanging operations and/or information between the electronic device 210 and the user (e.g., user 220 of FIGS. 2A and 2B). For example, the interaction may mean that commands, requests, and/or instructions of the user 220 are transferred to the electronic device 210, and the electronic device 210 performs a designated operation.

According to various embodiments, if it is identified that the interaction end condition is satisfied, the electronic device 300 may delete the updated external interaction information. The external interaction information may include information that is connectable between the external electronic device 230 and the network server (e.g., network server 250 of FIG. 2B). In case that the external interaction information is continuously effective even after the interaction with one user is ended, the user of the ended interaction may remotely perform the interaction, and the electronic device 300 may be unable to provide the interaction to a new user. For example, in case that the electronic device 300 is a public mobile robot, it may continuously perform the interaction even after the user gets out of the movement radius of the public mobile robot, and this may represent an obstacle to the utility of the public mobile robot. In order to prevent this, the electronic device 300 may delete the external interaction information if it is identified that the interaction is ended. According to various embodiments, the server that is connected to the external electronic device 230 by using the external interaction information may delete connection information (e.g., address information for accessing a web page, link information, designated address on the network server 250, access code and/or identification information) included in the external interaction information. For example, the network server 250 may delete the web page address for providing the connection with the external electronic device 230 in which the interaction end condition is satisfied. According to various embodiments, the voice recognition server 240 may directly identify whether the interaction end condition is satisfied, or may identify whether the interaction end condition is satisfied through reception of the information identified by the electronic device 300 from the electronic device 300. According to various embodiments, the network server 250 may directly identify whether the interaction end condition is satisfied, or may identify whether the interaction end condition is satisfied through reception of the information identified by the electronic device 300 from the electronic device 300.

With reference to FIG. 12A, FIG. 12B, FIG. 12C, and FIG. 12D, the electronic device 300 may determine the interaction end condition based on whether a new input is not received when more than a predetermined time elapses after the input is finally received from the user 220 having accessed the electronic device, whether the user 220 having accessed the electronic device has moved beyond a predetermined distance from the electronic device 300, whether at least one operation based on the received user voice analysis information is ended in all, and/or whether the voice interaction condition is switched from an unsatisfied state to a satisfied state. According to various embodiments, the electronic device 300 may determine that the interaction end condition is satisfied even in case of identifying the user's intention to end the interaction, such as in case of releasing the connection using the external electronic device 230.

Figure 12A:
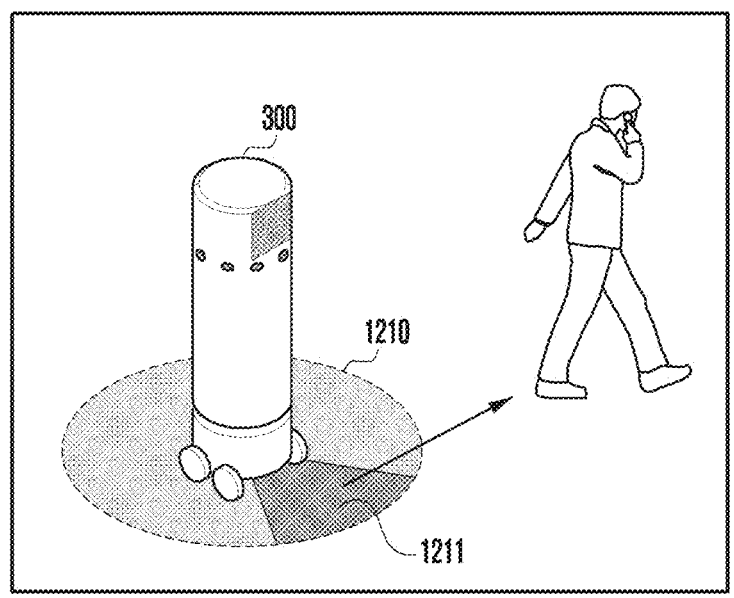
FIGS. 12A, 12B, 12C, and 12D are diagrams explaining an interaction end condition according to various embodiments.

With reference to FIG. 12A, the electronic device 300 may determine the interaction end condition based on whether the user 220 having accessed has moved to exceed a predetermined distance from the electronic device 300. According to various embodiments, in order to determine whether the user has moved to exceed the predetermined distance from the electronic device 300, the electronic device 300 may control the camera module (e.g., camera module 320 of FIG. 3) to capture the image for the user continuously and/or periodically during the interaction. According to various embodiments, the electronic device 300 may determine whether the user gets out of the electronic device 300 over the predetermined distance by using the captured image, and if the user gets farther away over the predetermined distance, the electronic device 300 may determine that the interaction end condition is satisfied. According to various embodiments, if the user gets out of the viewing angle of the camera module 320 and/or if the image having recognized as the user in the image captured by the camera module 320 is not present any more in the image, the electronic device 300 may determine that the user has moved to exceed the predetermined distance from the electronic device 300.

Figure 12B:
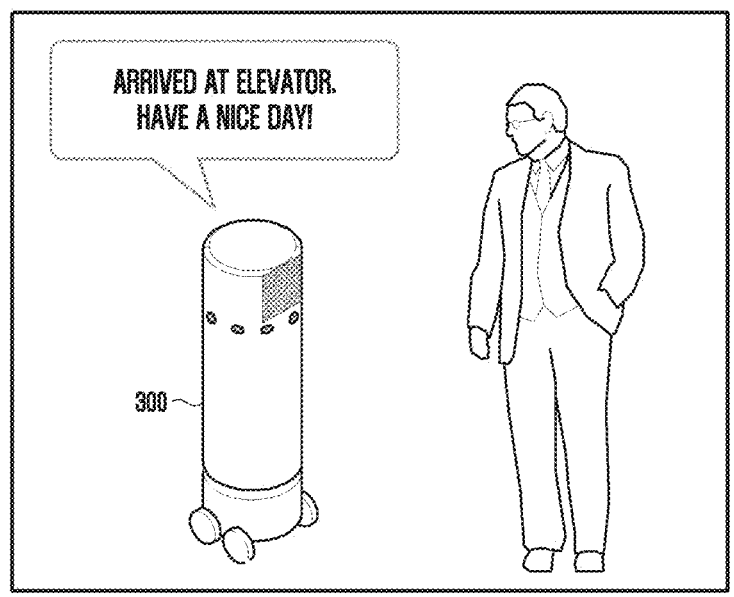

With reference to FIG. 12B, the electronic device 300 may determine the interaction end condition based on whether at least one operation based on the user voice analysis information is ended in all. According to various embodiments, the electronic device 300 may perform the at least one operation based on the user voice analysis information, and if the at least one operation based on the user voice analysis information is completed in all, the electronic device 300 may determine that the interaction end condition is satisfied.

Figure 12C:
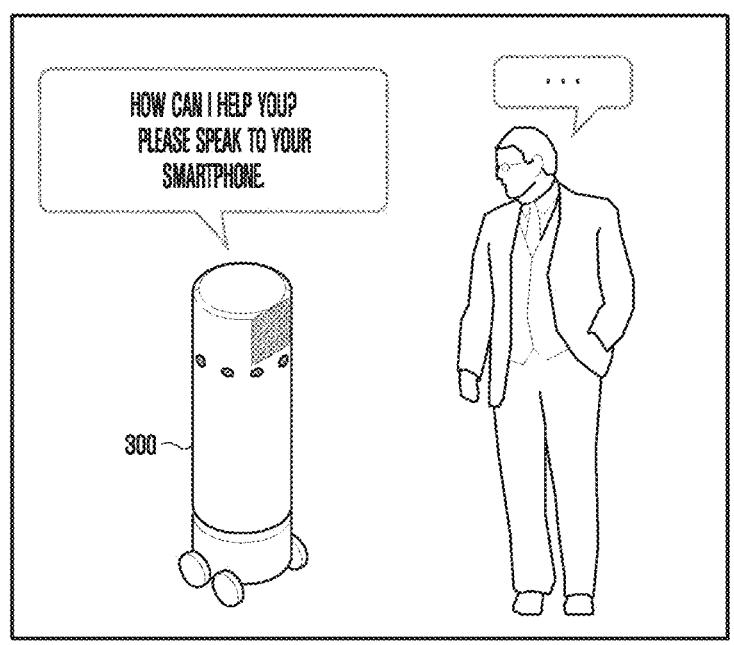

With reference to FIG. 12C, the interaction end condition may be determined based on a case where there is not the user input for a predetermined time. According to various embodiments, the electronic device 300 may determine whether a predetermined time elapses without a new input after the input is finally received from the user, based on that the user voice received by the electronic device 300 from the microphone 330 has not been received over the predetermined time. Further, the electronic device 300 may determine the same based on that the electronic device 300 does not receive the new voice analysis information over the predetermined time from the time when the electronic device 300 finally receives the user voice analysis information from the voice recognition server 240. Further, the voice recognition server 240 may determine that the user voice has not been received in the voice recognition server 240 over the predetermined time, and transmit that the interaction end condition is satisfied to the electronic device 300, and the electronic device 300 may determine whether the interaction end condition is satisfied through reception of the information on that the interaction end condition is satisfied from the voice recognition server 240. Further, the network server 250 may determine whether the interaction end condition is satisfied based on that the user voice has not been received in the network server 250 over the predetermined time.

Figure 12D:
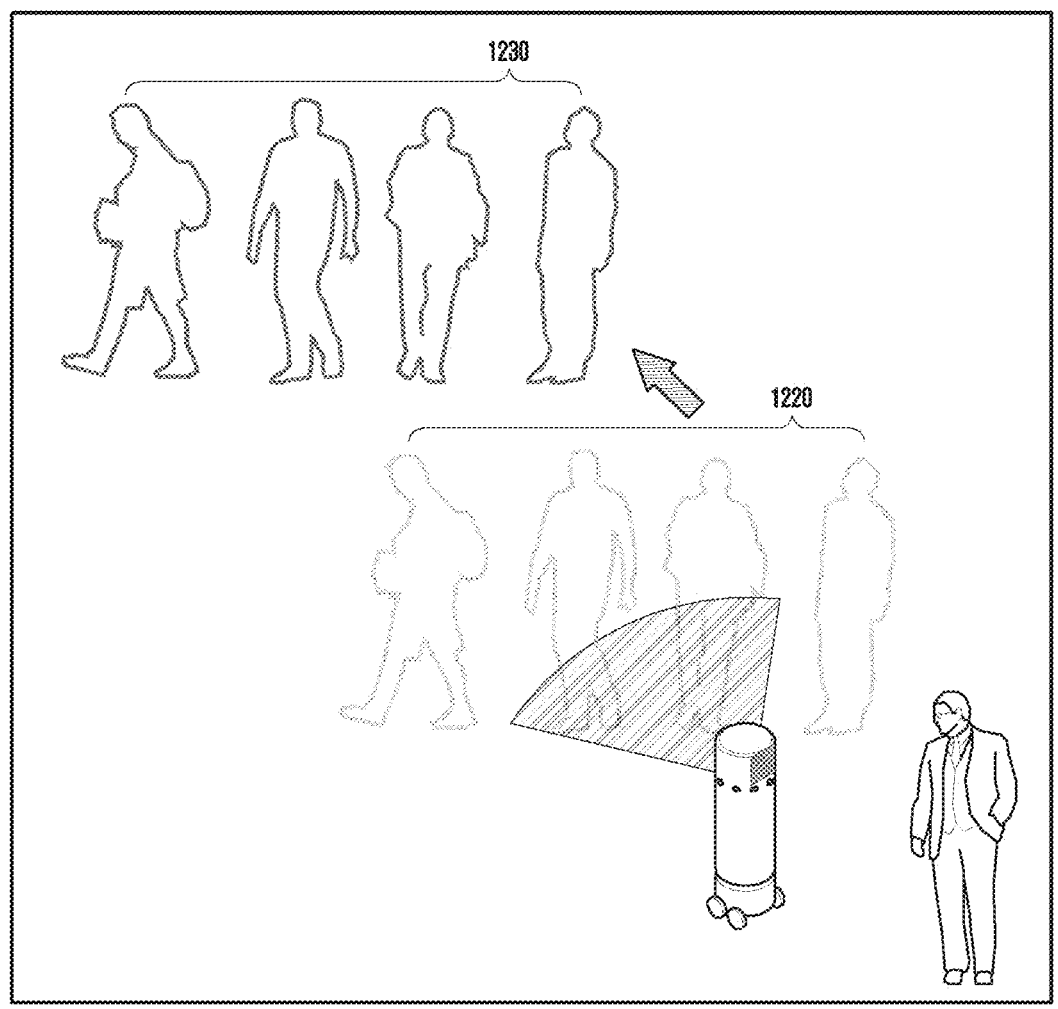

With reference to FIG. 12D, the electronic device 300 may determine the interaction end condition based on whether the at least one operation based on the received user voice analysis information has been ended in all based on whether the voice interaction condition is switched from the unsatisfied state to the satisfied state. According to various embodiments, the electronic device 300 may output the external interaction condition by determining that the voice interaction condition is not satisfied, and continuously identify the voice interaction condition while performing the interaction with the user. According to various embodiments, if it is determined that the voice interaction condition is switched from the existing unsatisfied stat to the satisfied state, the electronic device 300 may determine that the interaction end condition is satisfied based on the determination for the corresponding switching. With reference to FIG. 12D, the electronic device 300, having identified that the voice interaction condition is not satisfied based on the density level information due to the surrounding people 1220 having a high density level, may determine that the voice interaction condition is satisfied based on the density level information again if the density of surroundings is lowered thereafter. In this case, the electronic device 300 may identify that the interaction end condition is satisfied.

Figure 13:
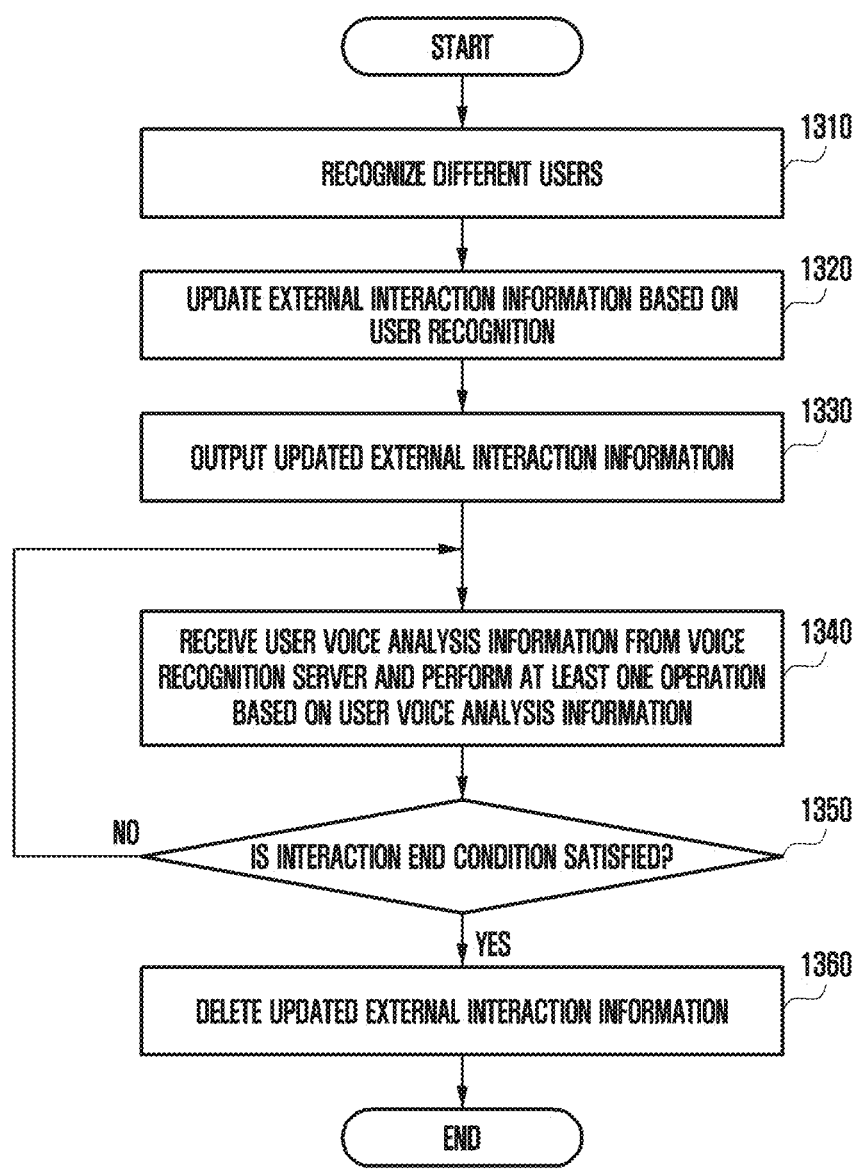
FIG. 13 is an operational flowchart for updating, outputting, and deleting interaction information of an electronic device according to various embodiments.

FIG. 13 is an operational flowchart for updating, outputting, and deleting interaction information of an electronic device according to various embodiments.

With reference to FIG. 13, operations for updating, outputting, and deleting interaction information of the electronic device (e.g., electronic device 101 of FIG. 1, electronic device 210 of FIGS. 2A and 2B, and/or electronic device 300 of FIG. 3) may be understood as operations performed by the processor (e.g., processor 120 of FIG. 1 and/or processor 370 of FIG. 3) included in the electronic device.

With reference to step 1310, the processor 370 may recognize different users, and generate and/or update the external interaction information based on the user recognition. According to various embodiments, the processor 370 may recognize the face of the recognized person from the image captured by the camera module (e.g., camera module 320 of FIG. 3). For example, the processor 370 may analyze the captured image, recognize the person through the image analysis, and recognize and identify the face of the person. According to various embodiments, the processor 370 may recognize and identify all faces of persons, who are present in the corresponding image by analyzing the captured image at the designated time, or may limitedly recognize and identify the faces of the persons who enter the designated distance from the electronic device 300. According to various embodiments, the processor 370 may recognize the face of the person (e.g., user) who approaches the electronic device 300, and distinguish the person from others. For example, the processor 370 may distinguish the user by using data corresponding to the face identification information temporarily and/or permanently stored in the memory (e.g., memory 380 of FIG. 3). According to various embodiments, the processor 370 may simply identify whether one user is different from other users, and may continuously identify the user having data identified in the past. Further, the processor 370 may select, recognize, and identify only a specific user (e.g., manager).

With reference to step 1320, the processor 370 may update the external interaction information based on the identified user recognition. In case of another user, the external interaction information may require a different web page, and in case of simply identifying the different user from the previous user based on the user recognition, the processor 370 may update the external interaction information even if the user is simply recognized as a new user after a predetermined time elapses from one interaction end, and further, the external interaction information may be updated in order to select the specific user (e g, manager) and separately provide the external interaction information for the manager According to various embodiments, the external interaction information output by the processor 370 may be the external interaction information updated based on the user recognition. According to various embodiments, the processor 370 may output the updated external interaction information.

With reference to step 1330, the processor 370 may output the external interaction information through the short range wireless communication by controlling the communication module (e.g., communication module 310 of FIG. 3). According to various embodiments, the communication module 310 may support the short range wireless communication, for example, Bluetooth, Bluetooth low energy (BLE), near field communication (NFC), wireless fidelity (Wi-Fi) direct, infrared data association (IrDA), and/or ultra-wideband (UWB), and the processor 370 may output the external interaction information to the outside by using the short range wireless communication. According to various embodiments, the processor 370 may input and/or update the external interaction information on the NFC tag provided in the communication module 310. For example, the processor 370 may write the designated information onto the NFC tag, and the signal output may be performed in a manner that the NFC tag having received energy by the electromagnetic field emitted from the external electronic device (e.g., external electronic device 230 of FIG. 2B) emits the signal caused by the electromagnetic induction. According to various embodiments, the processor 370 may output the message for guiding the user to receive the external interaction information by using the display module (e.g., display module 340 of FIG. 3) and/or the speaker (e.g., speaker 350 of FIG. 3), and the external electronic device 230 may receive the external interaction information by using the NFC tagging. According to various embodiments, the processor 370 may be connected to the external electronic device 230 by using the UWB communication, and transmit the external interaction information to the external electronic device 230. According to various embodiments, the processor 370 may generate a quick response (QR) code including the external interaction information. According to various embodiments, the processor 370 may generate the QR code including the external interaction information, and output the QR code by controlling the display module 340. According to various embodiments, the processor 370 may output the message for guiding the user to receive the external interaction information by using the display module 340 and/or the speaker 350, and the external electronic device 230 may receive the external interaction information through capturing and recognizing the QR code.

With reference to step 1340, the processor 370 may receive the user voice analysis information form the voice recognition server (e.g., voice recognition server 240 of FIGS. 2A and 2B), and perform at least one operation based on the user voice analysis information.

According to various embodiments, the processor 370 may receive the user voice analysis information from the voice recognition server 240. According to various embodiments, the external electronic device 230 may perform connection with the network server (e.g., network server 250 of FIG. 2B) by using the external interaction information. The external electronic device 230 may input and transmit the user voice on the user interface provided by the network server 250. According to various embodiments, the web page provided by the network server 250 may include the user interface for receiving the user input, and the user input that can be received may include the user voice, the input related to the operation of the electronic device 300, and the keyboard input. According to various embodiments, the network server 250 may receive the user input (e.g., user voice) from the external electronic device 230 connected thereto, and transmit the received input to the voice recognition server 240 and/or the electronic device 300. The processor 370 may receive the voice analysis information generated by the voice recognition server 240 having received the user voice through the network server 250 from the voice recognition server 240. According to various embodiments, the processor 370 may directly receive the user input from the network server 250.

According to various embodiments, the processor 370 may perform at least one operation based on the voice analysis information received from the voice recognition server 240. According to various embodiments, the processor 370 may perform the at least one operation based on the user input received from the network server 250. The at least one operation that is performed by the processor 370 based on the user input and/or the user voice analysis information may be at least one of the movement, rotation, audio signal output, and display output of the electronic device. For example, the processor 370 may provide the guide service or customer service including at least one of such operations based on the user voice analysis information.

With reference to step 1350, the processor 370 may determine whether the interaction end condition is satisfied. The interaction end condition may be the condition for determining whether the interaction is ended through the electronic device 300 and the user's external electronic device 230. The interaction may be an action of exchanging operations and/or information between the electronic device 300 and the user 220. For example, the interaction may mean that the command, request, and/or instructions of the user 220 are transferred to the electronic device 210, and the electronic device 210 performs the designated operation. According to various embodiments, the processor 370 may determine the interaction end condition based on whether a new input is not received when more than a predetermined time elapses after the input is finally received from the user 220 having accessed the electronic device, whether the user 220 having accessed the electronic device has moved beyond a predetermined distance from the electronic device 300, whether at least one operation based on the received user voice analysis information is ended in all, and/or whether the voice interaction condition is switched from the unsatisfied state to the satisfied state. According to various embodiments, the processor 370 may determine whether the predetermined time elapses without a new input after the input is finally received from the user, based on that the user voice received by the processor 370 from the microphone (e.g., microphone 330 of FIG. 3) has not been received over the predetermined time. Further, the processor 370 may determine the same based on that the processor 370 does not receive the new voice analysis information over the predetermined time from the time when the processor 370 finally receives the user voice analysis information from the voice recognition server 240. Further, the voice recognition server 240 may determine that the user voice has not been received in the voice recognition server 240 over the predetermined time, and transmit that the interaction end condition is satisfied to the electronic device 300, and the processor 370 may determine whether the interaction end condition is satisfied through reception of the information on that the interaction end condition is satisfied from the voice recognition server 240. Further, the network server 250 may determine whether the interaction end condition is satisfied based on that the user voice has not been received in the network server 250 over the predetermined time. According to various embodiments, in order to determine whether the user has moved to exceed a predetermined distance from the electronic device, the processor 370 may control the camera module 320 to capture the image for the user continuously and/or periodically during the interaction. According to various embodiments, the processor 370 may determine whether the user gets out of the electronic device 300 over the predetermined distance by using the captured image, and if the user gets farther away over the predetermined distance, the processor 370 may determine that the interaction end condition is satisfied. According to various embodiments, the processor 370 may perform at least one operation based on the user voice analysis information, and if the at least one operation based on the user voice analysis information is completed in all, the processor 370 may determine that the interaction end condition is satisfied. According to various embodiments, the processor 370 may output the external interaction information by determining that the voice interaction condition is not satisfied, and continuously identify the voice interaction condition while performing the interaction with the user. According to various embodiments, if it is determined that the voice interaction condition is switched from the existing unsatisfied state to the satisfied state, the processor 370 may determine that the interaction end condition is satisfied based on the determination of the corresponding switching. According to an embodiment, if it is determined that the interaction end condition is not satisfied, the processor 370 may return to the step 1340 to receive the voice analysis information from the voice recognition server 240, and perform the at least one operation based on the voice analysis information. According to various embodiments, if it is determined that the interaction end condition is satisfied, the processor 370 may proceed with step 1360.

With reference to the step 1360, if it is identified that the interaction end condition is satisfied, the processor 370 may delete the updated external interaction information. The external interaction information may include information that is connectable between the external electronic device 230 and the network server 250. In case that the external interaction information is continuously effective even after the interaction with one user is ended, the user of the ended interaction may remotely perform the interaction, and the electronic device 300 may be unable to provide the interaction to a new user. For example, in case that the electronic device 300 is a public mobile robot, it may continuously perform the interaction even after the user gets out of the movement radius of the public mobile robot, and this may obstacle to the utility of the public mobile robot. In order to prevent this, the processor 370 may delete the external interaction information if it is identified that the interaction is ended. According to various embodiments, the server that is connected to the external electronic device 230 by using the external interaction information may delete connection information (e.g., address information for accessing a web page, link information, designated address on the network server 250, access code and/or identification information) included in the external interaction information. For example, the network server 250 may delete the web page address for providing the connection with the external electronic device 230 in which the interaction end condition is satisfied. According to various embodiments, the voice recognition server 240 may directly identify whether the interaction end condition is satisfied, or may identify whether the interaction end condition is satisfied through reception of the information identified by the electronic device 300 from the electronic device 300. According to various embodiments, the network server 250 may directly identify whether the interaction end condition is satisfied, or may identify whether the interaction end condition is satisfied through reception of the information identified by the electronic device 300 from the electronic device 300.

According to various embodiments disclosed in the disclosure, an electronic device may include: a microphone; a camera module; a short range communication module configured to support a short range wireless communication; a communication module configured to communicate with a voice recognition server; a memory; and a processor operatively connected to the microphone, the communication module, and the memory, wherein the processor is configured to: identify whether an object that accesses the electronic device is a user by using the camera module, identify whether a voice interaction condition is satisfied based on context information, receive a user voice from the microphone in case that the user's access is identified and the voice interaction condition is satisfied, output external interaction information enabling an external electronic device to perform an interaction with the voice recognition server by using the short range communication module and receive user voice analysis information from the voice recognition server by using the communication module configured to communicate with the voice recognition server in case that the voice interaction condition is not satisfied, and perform at least one operation based on the received user voice analysis information.

Further, the electronic device may include a driving module operatively connected to the processor and configured to physically move or rotate the electronic device, wherein the processor may be configured to: identify an interaction location including at least one of a place and a direction suitable for the interaction with the user in case that the user's access is identified, and guide the user toward the interaction location.

Further, the processor may be configured to: identify at least one of noise level information obtained based on an audio signal input through the microphone and density level information obtained based on an image obtained by capturing the surroundings of the electronic device obtained by using the camera module, and identify the interaction location based on at least one of the noise level information and the density level information.

Further, the processor may be configured to guide the user toward the interaction location through movement or rotation toward the interaction location by using the driving module.

Further, the electronic device may further include a speaker and a display module, wherein the processor may be configured to: guide the user toward an optimum interaction location by outputting a message for guiding the interaction location to the speaker or the display module.

Further, the context information may include at least one of noise level information, density level information, content sensitivity information, and user selection information.

Further, the processor may be configured to: newly generate the external interaction information in case that the voice interaction condition is not satisfied, and output the generated external interaction information.

Further, the short range wireless communication may be a near field communication (NFC) or an ultra-wideband (UWB) communication, wherein the external interaction information may include a web page link related to the voice recognition server, and the web page link may be deactivated when a specific time elapses after the external interaction information is output.

Further, the electronic device may further include a display module, wherein the processor may be configured to generate and output a quick response (QR) code for the external interaction information to the display module.

Further, the processor may be configured to: recognize different users by using the camera module, update the external interaction information based on the recognition result of the recognized different users, and output the updated external interaction information.

Further, the processor may be configured to delete the updated external interaction information in case that an interaction end condition regarding whether the interaction with the user having accessed the electronic device is ended is satisfied.

Further, the interaction end condition may be determined based on at least one of whether more than a predetermined time elapses from the time when the voice analysis information on the user having accessed the electronic device is finally received, whether the user having accessed the electronic device has moved beyond a predetermined distance from the electronic device, whether at least one operation based on the received user voice analysis information is ended in all, and whether the voice interaction condition is switched from an unsatisfied state to a satisfied state.

Further, the processor may be configured to output a message for guiding the user's reception of the external interaction information to the speaker or the display module in case that the voice interaction condition is not satisfied.

According to various embodiments disclosed in the disclosure, a method, by an electronic device, for performing an interaction with a user may include: identifying whether an object that accesses the electronic device is a user; identifying whether to satisfy a voice interaction condition based on context information; receiving a user voice in case that the user's access is identified and the voice interaction condition is satisfied; outputting external interaction information enabling an external electronic device to perform an interaction with a voice recognition server by using short range wireless communication and receiving user voice analysis information from the voice recognition server in case that the voice interaction condition is not satisfied; and performing at least one operation based on the received user voice analysis information.

Further, the method may further include: identifying an interaction location including at least one of a place or a direction suitable for the interaction with the user, in case that the user's access is identified; and guiding the user toward the interaction location.

Further, the context information may include at least one of noise level information, density level information, content sensitivity information, and user selection information.

Further, the short range wireless communication may be a near field communication (NFC) or an ultra-wideband (UWB) communication, wherein the external interaction information may include a web page link related to the voice recognition server, and the web page link may be deactivated when a specific time elapses after the external interaction information is output.

Further, the outputting the external interaction information may include generating and outputting a quick response (QR) code for the external interaction information.

Further, the method may include: recognizing different users; updating the external interaction information based on the recognition result of the recognized different users; and outputting the updated external interaction information.

Further, the method may include deleting the updated external interaction information in case that an interaction end condition regarding whether the interaction with the user having accessed the electronic device is ended is satisfied.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a microphone;
a camera module;
a short range communication module configured to support a short range wireless communication;
a communication module configured to communicate with a voice recognition server;
a memory; and
a processor operatively connected to the microphone, the communication module, and the memory,
wherein the processor is configured to:
identify, using the camera module, whether an object that accesses the electronic device is a user,
identify, based on context information, whether a voice interaction condition is satisfied,
based on identifying that the object is the user and that the voice interaction condition is satisfied:
receive a user voice from the microphone, and
perform at least one operation based on the received user voice, and
based on the voice interaction condition not being satisfied:
output external interaction information enabling an external electronic device to perform an interaction with the voice recognition server by using the short range communication module,
receive, using the communication module, user voice analysis information from the voice recognition server,
perform at least one operation based on the received user voice analysis information,
determine whether an interaction end condition is satisfied, and
delete or deactivate the external interaction information based on the interaction end condition being satisfied;
wherein the external interaction information comprises a web page link related to the voice recognition server, and
wherein the web page link is deactivated when a specific time elapses after the external interaction information is output.

2. The electronic device of claim 1, further comprising a driving module operatively connected to the processor and configured to physically move or rotate the electronic device,
wherein the processor is further configured to:
based on identifying that the object is the user, identify an interaction location including at least one of a place and a direction suitable for the interaction with the user, and
guide the user toward the interaction location.

3. The electronic device of claim 2, wherein the processor is further configured to:
identify at least one of noise level information obtained based on an audio signal input through the microphone and density level information obtained based on an image obtained by capturing the surroundings of the electronic device obtained by using the camera module, and
identify the interaction location based on at least one of the noise level information and the density level information.

4. The electronic device of claim 2, wherein the processor is configured to guide the user toward the interaction location through at least one of movement and rotation toward the interaction location by using the driving module.

5. The electronic device of claim 2, further comprising a speaker and a display module,
wherein the processor is further configured to:
guide the user toward an optimum interaction location by outputting a message for guiding the interaction location to at least one of the speaker and the display module.

6. The electronic device of claim 1, wherein the context information comprises at least one of noise level information, density level information, content sensitivity information, and user selection information.

7. The electronic device of claim 1, wherein the processor is further configured to:
based on the voice interaction condition not being satisfied, newly generate the external interaction information, and
output the generated external interaction information.

8. The electronic device of claim 1, wherein the short range wireless communication is a near field communication (NFC) or an ultra-wideband (UWB) communication.

9. The electronic device of claim 1, further comprising a display module,
wherein the processor is further configured to generate and output a quick response (QR) code for the external interaction information to the display module.

10. The electronic device of claim 1, wherein the processor is further configured to:
recognize, using the camera module, different users,
update the external interaction information based on the recognition result of the recognized different users, and
output the updated external interaction information.

11. The electronic device of claim 1, wherein the interaction end condition is determined based on at least one of whether more than a predetermined time elapses from the time when the voice analysis information on the user having accessed the electronic device is finally received, whether the user having accessed the electronic device has moved beyond a predetermined distance from the electronic device, whether at least one operation based on the received user voice analysis information is ended in all, and whether the voice interaction condition is switched from an unsatisfied state to a satisfied state.

12. The electronic device of claim 1, wherein the processor is further configured to output, responsive to the voice interaction condition not being satisfied, a message for guiding the user's reception of the external interaction information to the speaker or the display module.

13. A method, by an electronic device, for performing an interaction with a user, the method comprising:
identifying whether an object that accesses the electronic device is a user;
identifying, based on context information, whether a voice interaction condition is satisfied;
based on identifying that the object is the user and that the voice interaction condition is satisfied:
receiving a user voice; and
performing at least one operation based on the received user voice;
based on the voice interaction condition not being satisfied:
outputting external interaction information enabling an external electronic device to perform an interaction with a voice recognition server by using short range wireless communication;
receiving user voice analysis information from the voice recognition server;
performing at least one operation based on the received user voice analysis information;
determine whether an interaction end condition is satisfied; and
delete or deactivate the external interaction information based on the interaction end condition being satisfied;
recognizing different users;
updating the external interaction information based on a recognition result of the recognized different users; and
outputting the updated external interaction information.

14. The method of claim 13, further comprising:
based on identifying that the object is the user, identifying an interaction location including at least one of a place or a direction suitable for the interaction with the user, in case that the user's access is identified; and
guiding the user toward the interaction location.

15. The method of claim 13, wherein the context information comprises at least one of noise level information, density level information, content sensitivity information, and user selection information.

16. The method of claim 13, wherein the short range wireless communication is a near field communication (NFC) or an ultra-wideband (UWB) communication,
wherein the external interaction information comprises a web page link related to the voice recognition server, and
wherein the web page link is deactivated when a specific time elapses after the external interaction information is output.

17. The method of claim 13, wherein outputting the external interaction information comprises generating and outputting a quick response (QR) code for the external interaction information.

18. The method of claim 13, further comprising deleting the updated external interaction information responsive to an interaction end condition regarding whether the interaction with the user having accessed the electronic device is ended is satisfied.

19. An electronic device comprising:
a microphone;
a camera module;
a short range communication module configured to support a short range wireless communication;
a communication module configured to communicate with a voice recognition server;
a memory; and
a processor operatively connected to the microphone, the communication module, and the memory,
wherein the processor is configured to:
identify, using the camera module, whether an object that accesses the electronic device is a user,
identify, based on context information, whether a voice interaction condition is satisfied,
based on identifying that the object is the user and that the voice interaction condition is satisfied:
receive a user voice from the microphone, and
perform at least one operation based on the received user voice, and
based on the voice interaction condition not being satisfied:
output external interaction information enabling an external electronic device to perform an interaction with the voice recognition server by using the short range communication module,
receive, using the communication module, user voice analysis information from the voice recognition server,
perform at least one operation based on the received user voice analysis information,
determine whether an interaction end condition is satisfied, and
delete or deactivate the external interaction information based on the interaction end condition being satisfied;

wherein the interaction end condition is determined based on at least one of whether more than a predetermined time elapses from the time when the voice analysis information on the user having accessed the electronic device is finally received, whether the user having accessed the electronic device has moved beyond a predetermined distance from the electronic device, whether at least one operation based on the received user voice analysis information is ended in all, and whether the voice interaction condition is switched from an unsatisfied state to a satisfied state.

\* \* \* \* \*